(12) United States Patent
Mitsumori

(10) Patent No.: US 8,031,640 B2
(45) Date of Patent: Oct. 4, 2011

(54) PACKET TRANSMISSION APPARATUS, PACKET FORWARDING METHOD AND PACKET TRANSMISSION SYSTEM

(75) Inventor: Yasuyuki Mitsumori, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 947 days.

(21) Appl. No.: 11/541,808

(22) Filed: Oct. 2, 2006

(65) Prior Publication Data

US 2007/0263660 A1    Nov. 15, 2007

(30) Foreign Application Priority Data

May 12, 2006 (JP) ................................. 2006-133183

(51) Int. Cl.
*H04L 12/28* (2006.01)
(52) U.S. Cl. .................... 370/258; 370/395.53; 370/403; 370/404; 370/405; 370/406; 370/424; 370/429; 370/469
(58) Field of Classification Search .................... 370/258
See application file for complete search history.

(56) References Cited

U.S. PATENT DOCUMENTS

| | | | |
|---|---|---|---|
| 6,430,621 B1 * | 8/2002 | Srikanth et al. ............... | 709/238 |
| 7,050,434 B2 | 5/2006 | Tamura et al. | |
| 7,277,386 B1 * | 10/2007 | Ferguson et al. ............. | 370/230 |
| 7,292,577 B1 * | 11/2007 | Ginipalli et al. ............ | 370/395.1 |
| 2001/0049739 A1 * | 12/2001 | Wakayama et al. ........... | 709/230 |
| 2002/0156918 A1 * | 10/2002 | Valdevit et al. ............... | 709/238 |
| 2003/0081606 A1 | 5/2003 | Tamura et al. | |
| 2004/0103212 A1 * | 5/2004 | Takeuchi et al. .............. | 709/245 |
| 2004/0170184 A1 * | 9/2004 | Hashimoto .................... | 370/401 |
| 2005/0138171 A1 * | 6/2005 | Slaight .......................... | 709/225 |
| 2005/0243845 A1 | 11/2005 | Higashitaniguchi et al. | |
| 2006/0109802 A1 * | 5/2006 | Zelig et al. .................... | 370/258 |
| 2006/0182118 A1 * | 8/2006 | Lam et al. ................ | 370/395.42 |

FOREIGN PATENT DOCUMENTS

| | | |
|---|---|---|
| JP | 2003-143178 | 5/2003 |
| WO | 2004/073262 | 8/2004 |
| WO | 2005/015851 | 2/2005 |

OTHER PUBLICATIONS

Japanese Office Action dated Jul. 19, 2011, from corresponding Japanese Application No. 2006-133183.

* cited by examiner

*Primary Examiner* — Daniel J Ryman
*Assistant Examiner* — Jae Y Lee
(74) *Attorney, Agent, or Firm* — Katten Muchin Rosenman LLP

(57) ABSTRACT

A packet transmission system enabling VLAN packet forwarding of the MAC layer at the RPR layer. An address translation table associates with a VLAN identifier a MAC address and a flag showing validity of the VLAN identifier. A flag set valid means that an own node belongs to a VLAN domain with the VLAN identifier. In a case where a received packet is a VLAN packet, a first node searches the address translation table based on the VLAN identifier for a MAC address, creates an RPR packet with the MAC address stored as an RPR destination address, and transmits the RPR packet to an RPR network. A second node searches the address translation table based on the MAC address stored in the RPR packet, and if a corresponding flag is a valid flag, regards the packet as being addressed to a VLAN to which the own node belongs, and transmits the packet to the VLAN after deleting the RPR header therefrom.

18 Claims, 21 Drawing Sheets

T1 VLAN TRANSLATION TABLE
(ADDRESS TRANSLATION TABLE)

| VLAN ID | RPR MAC ADDRESS | VALIDITY |
|---|---|---|
| 0 | 80-00-00-00-00-00 | 0 |
| 1 | 80-00-00-00-00-01 | 1 |
| 2 | 80-00-00-00-00-02 | 1 |
| 3 | 80-00-00-00-00-03 | 0 |
| ⋮ | ⋮ | ⋮ |
| 4094 | 80-00-00-00-0F-FE | 0 |
| 4095 | 80-00-00-00-0F-FF | 0 |

FIG. 4

T1a VLAN TRANSLATION TABLE

| OFFSET | VLAN ID | RPR MAC ADDRESS | VALIDITY |
|---|---|---|---|
| 00 | 0 | 80-00-00-00-00-00 | 1 |
| 00 | 1 | 80-00-00-00-00-01 | 1 |
| ⋮ | ⋮ | ⋮ | ⋮ |
| 00 | 4095 | 80-00-00-00-0F-FF | 0 |
| 01 | 0 | 80-00-00-00-10-01 | 1 |
| 01 | 1 | 80-00-00-00-10-00 | 1 |
| ⋮ | ⋮ | ⋮ | ⋮ |
| 01 | 4095 | 80-00-00-00-1F-FF | 0 |

FIG. 10

T1b VLAN TRANSLATION TABLE

| VLAN ID | RPR MAC ADDRESS | VALIDITY | EAST | WEST |
|---|---|---|---|---|
| 0 | 80-00-00-00-00-00 | 1 | 1 | 0 |
| 1 | 80-00-00-00-00-01 | 1 | 1 | 0 |
| 2 | 80-00-00-00-00-02 | 1 | 0 | 1 |
| 3 | 80-00-00-00-00-03 | 1 | 0 | 1 |
| ⋮ | ⋮ | ⋮ | ⋮ | ⋮ |
| 4095 | 80-00-00-00-0F-FF | 0 | 0 | 0 |

FIG. 12

T1c VLAN TRANSLATION TABLE

| VLAN ID | RPR MAC ADDRESS | VALIDITY | EAST | WEST | HASH |
|---|---|---|---|---|---|
| 0 | 80-00-00-00-00-00 | 1 | 1 | 0 | 0 |
| 1 | 80-00-00-00-00-01 | 1 | 1 | 0 | 0 |
| 2 | 80-00-00-00-00-02 | 1 | 0 | 1 | 0 |
| 3 | 80-00-00-00-00-03 | 1 | 0 | 0 | 1 |
| ... | ... | ... | ... | ... | ... |
| 4095 | 80-00-00-00-0F-FF | 0 | 0 | 0 | 0 |

FIG. 13

T1d VLAN TRANSLATION TABLE

| VLAN ID | RPR MAC ADDRESS | VALIDITY | EAST | WEST | HASH |
|---|---|---|---|---|---|
| 0 | 80-00-00-00-00-00 | 1 | 1 | 0 | 0 |
| 1 | 80-00-00-00-00-01 | 1 | 0 | 1 | 0 |
| 2 | 80-00-00-00-00-02 | 1 | 0 | 0 | 1 |
| 3 | 80-00-00-00-00-03 | 1 | 0 | 0 | 2 |
| ... | ... | ... | ... | ... | ... |
| 4095 | 80-00-00-00-0F-FF | 0 | 0 | 0 | 0 |

FIG. 14

T1e VLAN TRANSLATION TABLE

| VLAN ID | RPR MAC ADDRESS | VALIDITY | EAST | TTL (EAST) | WEST | TTL (WEST) |
|---|---|---|---|---|---|---|
| 0 | 80-00-00-00-00-00 | 0 | 0 | 0 | 0 | 0 |
| 1 | 80-00-00-00-00-01 | 1 | 1 | 2 | 0 | 0 |
| 2 | 80-00-00-00-00-02 | 0 | 0 | 0 | 0 | 0 |
| 3 | 80-00-00-00-00-03 | 1 | 0 | 0 | 1 | 4 |
| ... | ... | ... | ... | ... | ... | ... |
| 4095 | 80-00-00-00-0F-FF | 0 | 0 | 0 | 0 | 0 |

FIG. 15

T1f VLAN TRANSLATION TABLE

| VLAN ID | RPR MAC ADDRESS | VALIDITY | EAST | TTL (EAST) | WEST | TTL (WEST) | HASH |
|---|---|---|---|---|---|---|---|
| 0 | 80-00-00-00-00-00 | 0 | 0 | 0 | 0 | 0 | 0 |
| 1 | 80-00-00-00-00-01 | 1 | 1 | 2 | 0 | 0 | 0 |
| 2 | 80-00-00-00-00-02 | 0 | 0 | 0 | 0 | 0 | 0 |
| 3 | 80-00-00-00-00-03 | 1 | 0 | 0 | 0 | 0 | 1 |
| ... | ... | ... | ... | ... | ... | ... | ... |
| 4095 | 80-00-00-00-0F-FF | 0 | 0 | 0 | 0 | 0 | 0 |

FIG. 16

T1g VLAN TRANSLATION TABLE

| VLAN ID | RPR MAC ADDRESS | VALIDITY | EAST | TTL (EAST) | WEST | TTL (WEST) |
|---|---|---|---|---|---|---|
| 0 | 80-00-00-00-00-00 | 0 | 0 | 0 | 0 | 0 |
| 1 | 80-00-00-00-00-01 | 1 | 1 | 2 | 0 | 0 |
| 2 | 80-00-00-00-00-02 | 0 | 0 | 0 | 0 | 0 |
| 3 | 80-00-00-00-00-03 | 1 | 1 | 1 | 1 | 2 |
| ⋮ | ⋮ | ⋮ | ⋮ | ⋮ | ⋮ | ⋮ |
| 4095 | 80-00-00-00-0F-FF | 0 | 0 | 0 | 0 | 0 |

FIG. 17

T4 CLASS CONVERSION TABLE

| VLAN PRIORITY | RPR CLASS |
|---|---|
| 7 | A |
| 6 | A |
| 5 | B |
| 4 | B |
| 3 | B |
| 2 | C |
| 1 | C |
| 0 | C |

FIG. 18

T4a CLASS CONVERSION TABLE

| VLAN PRIORITY | RPR CLASS |
|---|---|
| 7 | A |
| 6 | A |
| 5 | B |
| 4 | B |
| 3 | B |
| 2 | C |
| 1 | C |
| 0 | C |
| UNTAG | C |

FIG. 19

T1h VLAN TRANSLATION TABLE

| VLAN ID | RPR MAC ADDRESS | VALIDITY | EAST | TTL (EAST) | WEST | TTL (WEST) | RULE |
|---|---|---|---|---|---|---|---|
| 0 | 80-00-00-00-00-00 | 0 | 0 | 0 | 0 | 0 | 0 |
| 1 | 80-00-00-00-00-01 | 1 | 1 | 2 | 0 | 0 | 1 |
| 2 | 80-00-00-00-00-02 | 0 | 0 | 0 | 0 | 0 | 0 |
| 3 | 80-00-00-00-00-03 | 1 | 0 | 0 | 1 | 3 | 2 |
| ⋮ | ⋮ | ⋮ | ⋮ | ⋮ | ⋮ | ⋮ | ⋮ |
| 4095 | 80-00-00-00-0F-FF | 0 | 0 | 0 | 0 | 0 | 0 |

FIG. 20

PACKET TRANSMISSION APPARATUS, PACKET FORWARDING METHOD AND PACKET TRANSMISSION SYSTEM

CROSS-REFERENCE TO RELATED APPLICATIONS

This application is based upon and claims the benefits of priority from the prior Japanese Patent Application No. 2006-133183, filed on May 12, 2006, the entire contents of which are incorporated herein by reference.

BACKGROUND OF THE INVENTION (1) Field of the Invention

This invention relates to a packet transmission apparatus, a packet forwarding method, and a packet transmission system. More particularly, this invention relates to a packet transmission apparatus, a packet forwarding method, and a packet transmission system, which transmits packets with a Resilient Packet Ring (RPR) network as a backbone, the RPR supporting bandwidth sharing on a ring.

(2) Description of the Related Art

As a communication backbone for wide-area networks enabling long-distance transmission, Synchronous Optical NETwork/Synchronous Digital Hierarchy (SONET/SDH)-based ring networks are mainly used. In recent years, however, a technology called an RPR has been a focus of attention as an alternative of SONET/SDH.

The RPR is a new Media Access Control (MAC) transmission technology being standardized by the IEEE802.17 working group, and realizes a high-reliable dual packet ring network that enables swift switching independent of layer 1 (an existing technology is employed for the layer 1). In addition, with spatial reuse that allows bandwidth sharing among separated desired zones, the RPR can increase ring bandwidth availability.

The RPR technology enables transmitting IEEE802.17 MAC frames (RPR frames) to a ring network by using a physical layer of layer 1 including a transmission rate system for SONET Optical Carrier (OC)-n or SDH synchronous Transport Module (STM)-n, or 10 GbE (enables RPR over SONET/SDH, RPR over GBE, etc.).

The IEEE802.17 does not provide a specification for processing Virtual Local Area Network (VLAN) protocols at the RPR layer. Therefore, an RPR node cannot process such VLAN protocols at the RPR layer but has to process an incoming VLAN packet at the MAC layer that is higher than the RPR layer.

In a case where an RPR is used as a relay network of a VLAN using a VLAN protocol, each RPR node receives all packets going around the ring and always passes the all packets from the RPR layer to the MAC layer to check the VLAN identifiers (VLAN IDs) of the packets.

Then the RPR node determines whether each packet has the VLAN ID of a VLAN to which the own node belongs, in order to determine whether to receive or destroy the VLAN packet. That is, each node should check all packets from the ring at the MAC layer to see whether to take in and process the packets. In order to check the all packets without fail, the MAC layer should have capability of processing packets within the RPR bandwidth.

As a conventional VLAN technique, there has been proposed a technique of realizing group communication by transmitting a frame having set therein an own group address and a transmission destination terminal identifier (for example, refer to Japanese Unexamined Patent Publication No. 2003-143178 (paragraphs [0012]-[0014], FIG. 1)).

FIG. 21 shows a configuration of an RPR VLAN where an RPR is used as a VLAN relay network. The RPR VLAN 100 comprises five RPR nodes N1 to N5 and terminals t1 to t10.

The node N1 is connected to the terminals t1 and t2, the node N2 to the terminals t3 and t4, the node N3 to the terminals t5 and t6, the node N4 to the terminals t7 and t8, and the node N5 to the terminals t9 and t10.

In addition, on the network, there are tree VLANs 1, 2, and 3. Out of the RPR nodes N1 to N5, the nodes N1, N2 and N3 belong to the VLAN 1, the nodes N3, N4, and N5 belong to the VLAN 2, and the nodes N1, N2, N4 and N4 belong to the VLAN 3.

These combinations are determined depending on which VLANs the terminals connected to own nodes belong to.

Now, the VLAN 1 will be described by way of example. It is assumed that the terminal t1, which belongs to the VLAN 1 and is connected to the node N1, transmits a packet with VLAN ID=1, and the node N1 receives and transmits this packet with VLAN ID=1 to the RPR ring. The node N1 converts the VLAN packet with the VLAN ID of the VLAN 1 into an RPR packet and transmits this RPR packet clockwise (to the east side). At this time the node N1 stores an own MAC address as a transmission source address in the RPR packet. It should be noted that the RPR packet may be transmitted counterclockwise (to the west side).

The RPR packet transmitted to the ring is received by the node N2. Since a VLAN ID cannot be identified at the RPR layer in IEEE802.17 RPR technology, the node N2 processes the RPR packet at the MAC layer, and also forwards the RPR packet to the node N3 in the east direction.

The node N2 first checks the VLAN ID at the MAC layer, and if the own node belongs to a VLAN identified by the VLAN ID, takes in the packet, and forwards the packet to terminals based on MAC learning of the MAC layer. On the other hand, the node N3 receiving the RPR packet from the node N2 operates in the same manner as the node N2.

Each of the nodes N4 and N5 receives the RPR packet on the ring similarly. The node N4, N5 takes the packet into the own node and checks the VLAN ID of the packet at the MAC layer. Since the nodes N4 and N5 do not belong to the VLAN 1, the node N4, N5 destroys the packet with VLAN ID=1 at the MAC layer.

Simultaneously, the node N4, N5 transmits the RPR packet to the east side. After going around the ring, the RPR packet transmitted from the node N1 returns to the node N1. Since the node N1 recognizes that the RPR packet has the own node address as the transmission source address and therefore the RPR packet was originally transmitted by the own node, the node N1 does not transmit the packet to the ring but destroys the RPR packet, thereby preventing the RPR packet from circulating the ring again.

As described above, in the IEEE802.17 RPR technology, the VLAN ID of a VLAN cannot be identified at the RPR layer, so that each RPR node necessarily passes an incoming packet from the RPR layer to the MAC layer in order to check the VLAN ID of the VLAN packet.

Therefore, such a conventional RPR technology, in a case of a ring bandwidth of 10 Gbps, the MAC layer of an RPR node requires packet processing capability for 10 Gbps, which is equal to the ring bandwidth, even if packets to be processed in a relevant VLAN are less than 1 Gbps, which increases processing loads on the MAC layer and also increases cost due to over specification.

Further, a VLAN packet necessarily goes around the ring and is removed from the ring by a transmission source RPR node, which causes the packet to pass through unnecessary nodes, resulting in wasting ring bandwidth.

In the above example, since only the RPR nodes N1, N2 and N3 belong to the VLAN 1, the packet with VLAN ID=1 transmitted from the node N1 to the east side may not be forwarded to the nodes N4 and N5. That is to say, from an east side point of view, the packet unnecessarily goes through zones between the nodes N3 and N4, between the nodes N4 and N5 and between the nodes N5 and N1. This wastes the ring bandwidth.

SUMMARY OF THE INVENTION

This invention has been made in view of foregoing and intends to a packet transmission apparatus, a packet forwarding method, and a packet transmission system, for realizing high quality packet transmission by providing a function of detecting a VLAN ID at the RPR layer and performing packet forwarding of the MAC layer at the RPR layer.

To achieve the above object, there is provided a packet transmission system for performing packet transmission with a Resilient Packet Ring (RPR) network forming a bandwidth sharing ring as a backbone. This packet transmission system comprises a first node, a second node and a transmission medium. The first node has: an address translation table associating a MAC address and a flag with a virtual network identifier, the flag indicating whether the own node belongs to a virtual network domain with the virtual network identifier, the virtual network identifier identifying a virtual network that is a virtual network group set independently of a physical connection; a MAC layer reception processor for performing a reception process on a packet received from the virtual network formed on the RPR network; and an RPR layer transmission processor for determining whether the packet is a virtual network packet, and if it is determined that the packet is the virtual network packet, searching the address translation table based on a stored virtual network identifier of the packet for a corresponding MAC address, creating an RPR packet by adding to the packet an RPR header having the corresponding MAC address set therein as an RPR destination address, and performing a transmission process to the RPR network on the RPR packet. The second node has: the address translation table; an RPR layer reception processor for receiving the RPR packet and if the RPR packet does not carry an own node address as a transmission source address, searching the address translation table based on the MAC address stored in the RPR header as the RPR destination address, and if a corresponding flag is a valid flag, regards the RPR packet as being addressed to a virtual network to which the own node belongs, and outputting the RPR packet after deleting the RPR header from the RPR packet; and a MAC layer transmission processor for performing a transmission process to the virtual network on the packet received from the RPR layer reception processor. The transmission medium connects a plurality of nodes in a ring topology with a dual transmission line, the plurality of nodes including the first node and the second node.

The above and other objects, features and advantages of the present invention will become apparent from the following description when taken in conjunction with the accompanying drawings which illustrate preferred embodiments of the present invention by way of example.

BRIEF DESCRIPTION OF THE DRAWINGS

FIG. 4 shows a VLAN translation table.
FIG. 10 shows a VLAN translation table having offset values.
FIGS. 12 to 17 show VLAN translation tables.
FIGS. 18 and 19 show class conversion tables.
FIG. 20 shows a VLAN translation table.

DESCRIPTION OF THE PREFERRED EMBODIMENTS

Figure 1:
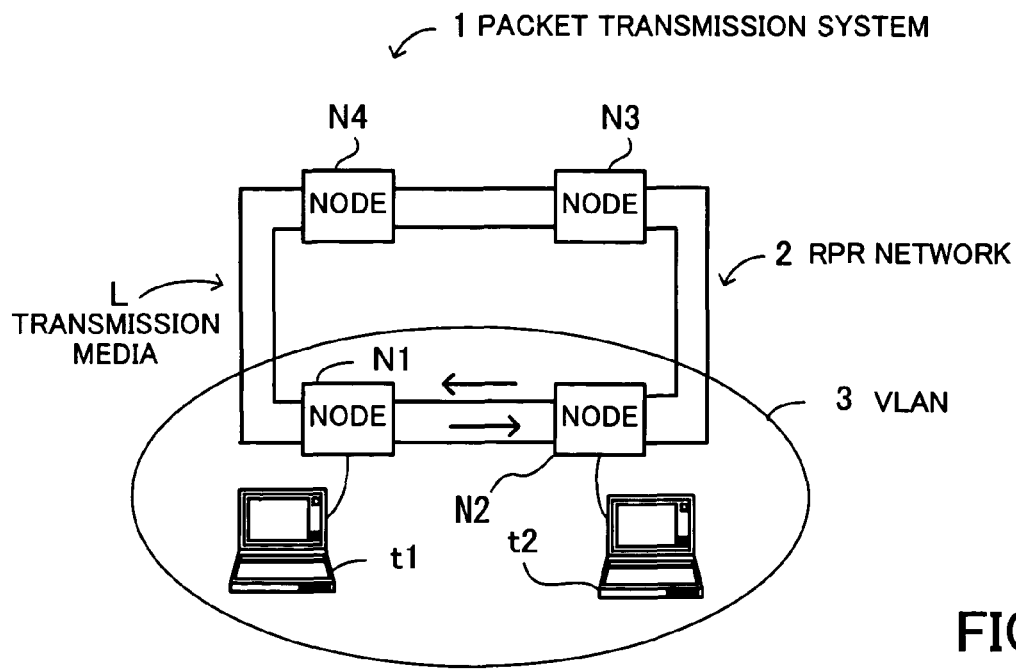
FIG. 1 is a principle view of a packet transmission system.
Figure 1:
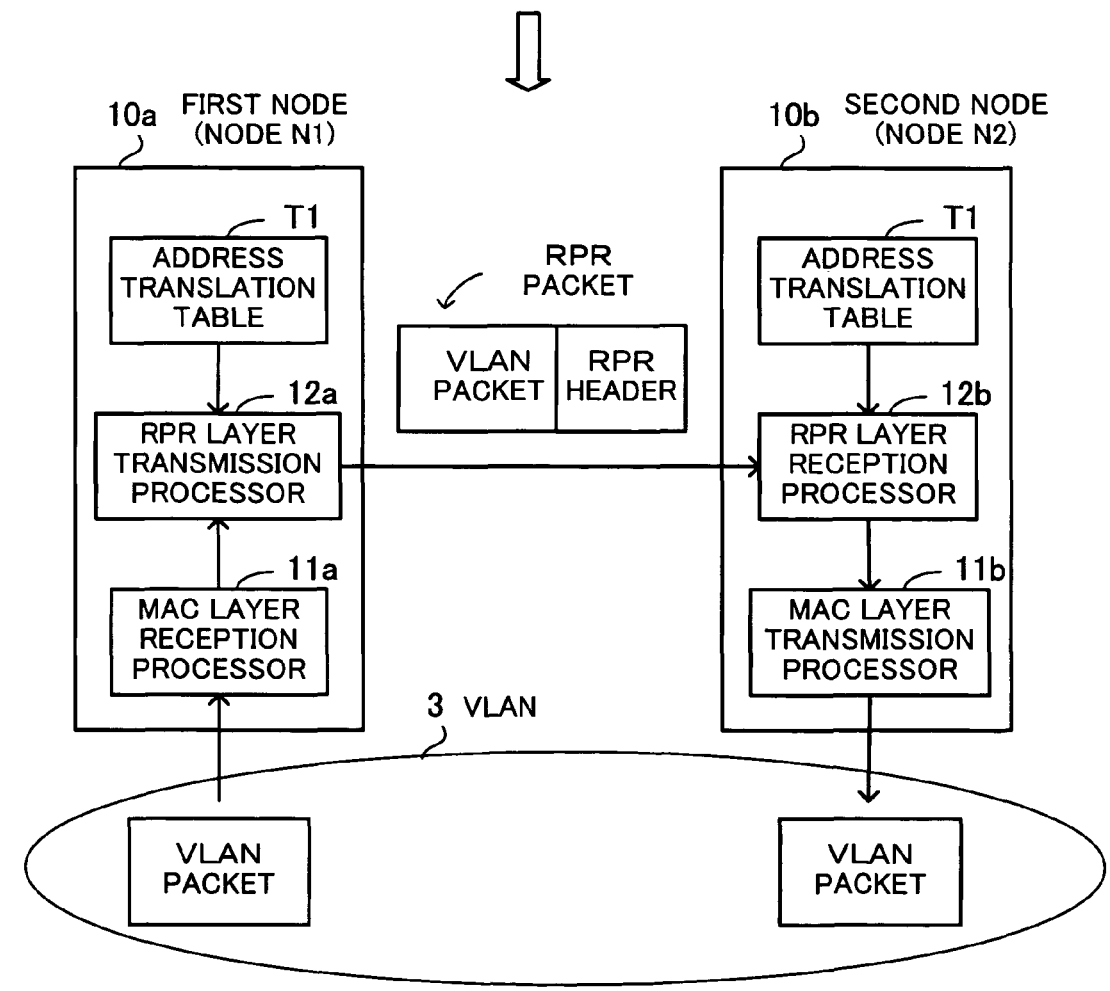

Preferred embodiments of this invention will be described with reference to the accompanying drawings, wherein like reference numerals refer to like elements throughout.

FIG. 1 is a principle view of a packet transmission system. The packet transmission system 1 is a system for transmitting packets by using an RPR network as a relay network for virtual networks or wide-area Ethernets (trademark). A virtual network corresponds to a virtual LAN (VLAN), for example, and is referred to as a VLAN in the following description.

In the packet transmission system 1, nodes N1 to N4 are networked in a ring topology with a dual transmission medium L on an RPR network 2. The transmission medium L is an optical fiber cable, for example.

The tributary sides of the nodes N1 and N2 are connected to terminals t1 and t2, respectively. The nodes N1 and N2 and the terminals t1 and t2 compose a VLAN 3 on the RPR network 2.

The first node 10a (node N1) has an address translation table T1, a MAC layer reception processor 11a, and an RPR layer transmission processor 12a. The address translation table T1 associates MAC addresses and flags with VLAN identifiers (hereinafter, referred to as VLAN IDs), the MAC addresses preset as destination addresses (DA) of RPR packets and having one-to-one correspondence with the VLAN IDs, the VLAN IDs identifying VLAN domains. A flag shows validity of a VLAN ID. A flag is set valid if the own node belongs to a VLAN domain with a VLAN ID, meaning that the VLAN ID is valid (this table structure will be described later with reference to FIG. 4).

The MAC layer reception processor 11a performs a reception process at the MAC layer on a packet received via the tributary side of the node N1 (that is, a reception process on the packet with a MAC header). The RPR layer transmission processor 12a determines whether the packet received by the MAC layer reception processor 11a is a VLAN packet, and if yes, searches the address translation table T1 based on the VLAN ID for a corresponding MAC address.

A packet is identified as a VLAN packet if the protocol ID (PID, described later) region of the packet carries a specified PID that is generally set in VLAN packets by transmission source terminals.

Then the RPR layer transmission processor 12a creates an RPR packet by adding to the packet an RPR header having the detected MAC address stored therein as an RPR destination address. The RPR layer transmission processor 12a then performs a transmission process at the RPR layer (a transmission process on the packet with the RPR header), thereby transmitting the RPR packet to the RPR network 2.

The second node 10b (node N2) has the address translation table T1, a MAC layer transmission processor 11b, and an RPR layer reception processor 12b. The RPR layer reception processor 12b receives an RPR packet and performs a reception process at the RPR layer (that is, a reception process on the packet with an RPR header). At this time, the RPR layer reception processor 12b checks the transmission source address of the RPR packet. If the transmission source address is the own node address, the RPR layer reception processor 12b destroys this RPR packet since it can be confirmed that the RPR packet was originally transmitted by the own node and has returned after going around the RPR network 2.

If the transmission source address of the RPR packet is not the own node address, on the contrary, the RPR layer reception processor 12b searches the address translation table T1 based on the MAC address stored as the destination address in the RPR header. If a flag is a valid flag, the RPR layer reception processor 12b regards the packet as being addressed to the VLAN 3 that the own node belongs to, and passes the packet to the MAC layer transmission processor 11b after deleting the RPR header there. The MAC layer transmission processor 11b performs a transmission process to the VLAN 3 on the packet received from the RPR layer reception processor 12b at the MAC layer (that is, a transmission process on the packet with a MAC header).

If the flag is an invalid flag, on the contrary, the RPR layer reception processor 12b determines that the packet is not addressed to the VLAN 3 that the own node belongs to and therefore is unrelated, and forwards the RPR packet to the next node N3 on the ring, without passing it to the MAC layer transmission processor 11b.

As described above, in accordance with this invention, determination on whether a received RPR packet is addressed to a VLAN that an own node belongs to, that is, whether the packet should be processed by the MAC layer transmission processor of the own node can be made based on information included in the header of the RPR packet by using an RPR layer processor. If it is determined that the RPR packet is unrelated to the own node, the RPR layer processor forwards the packet to a next node at the RPR layer, without passing the packet to the MAC layer processor of the own node, thus making it possible to reduce loads on the MAC layer processor.

Figure 3:
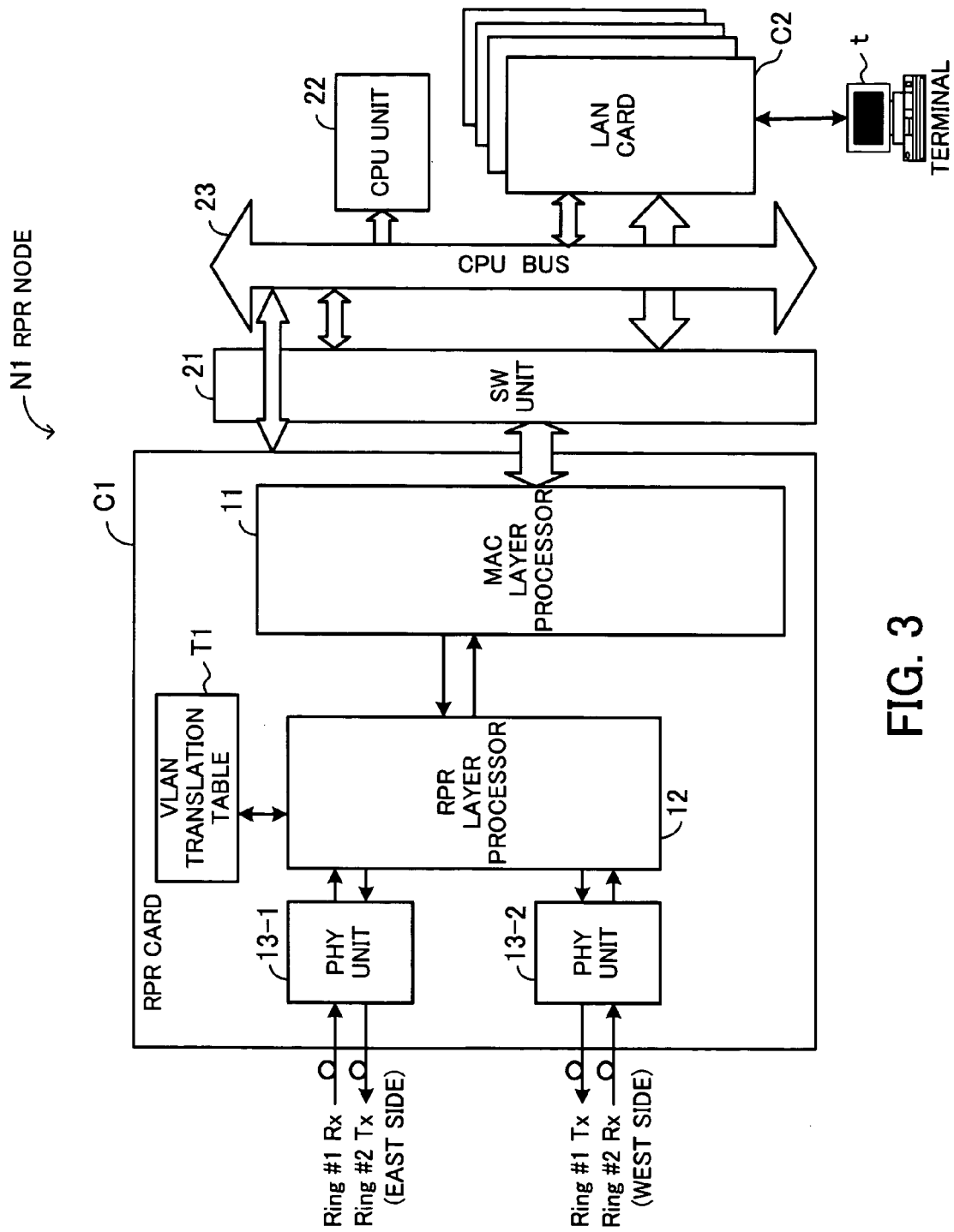
FIG. 3 shows a block diagram of an RPR node.

For ease of explanation on the packet transmission system 1, the first node 10a and the second node 10b are separately provided. In general, however, the above-described constituent elements are included in one node as a packet transmission apparatus. Especially, as shown in FIG. 3, which will be described later, the MAC layer reception processor 11a and the MAC layer transmission processor 11b are incorporated as a single MAC layer processor (hereinafter, referred to as MAC layer processor 11), and the RPR layer transmission processor 12a and the RPR layer reception processor 12b are incorporated as a single RPR layer processor (hereinafter, referred to as RPR layer processor 12).

A configuration of the packet transmission system will be now described.

Figure 2:
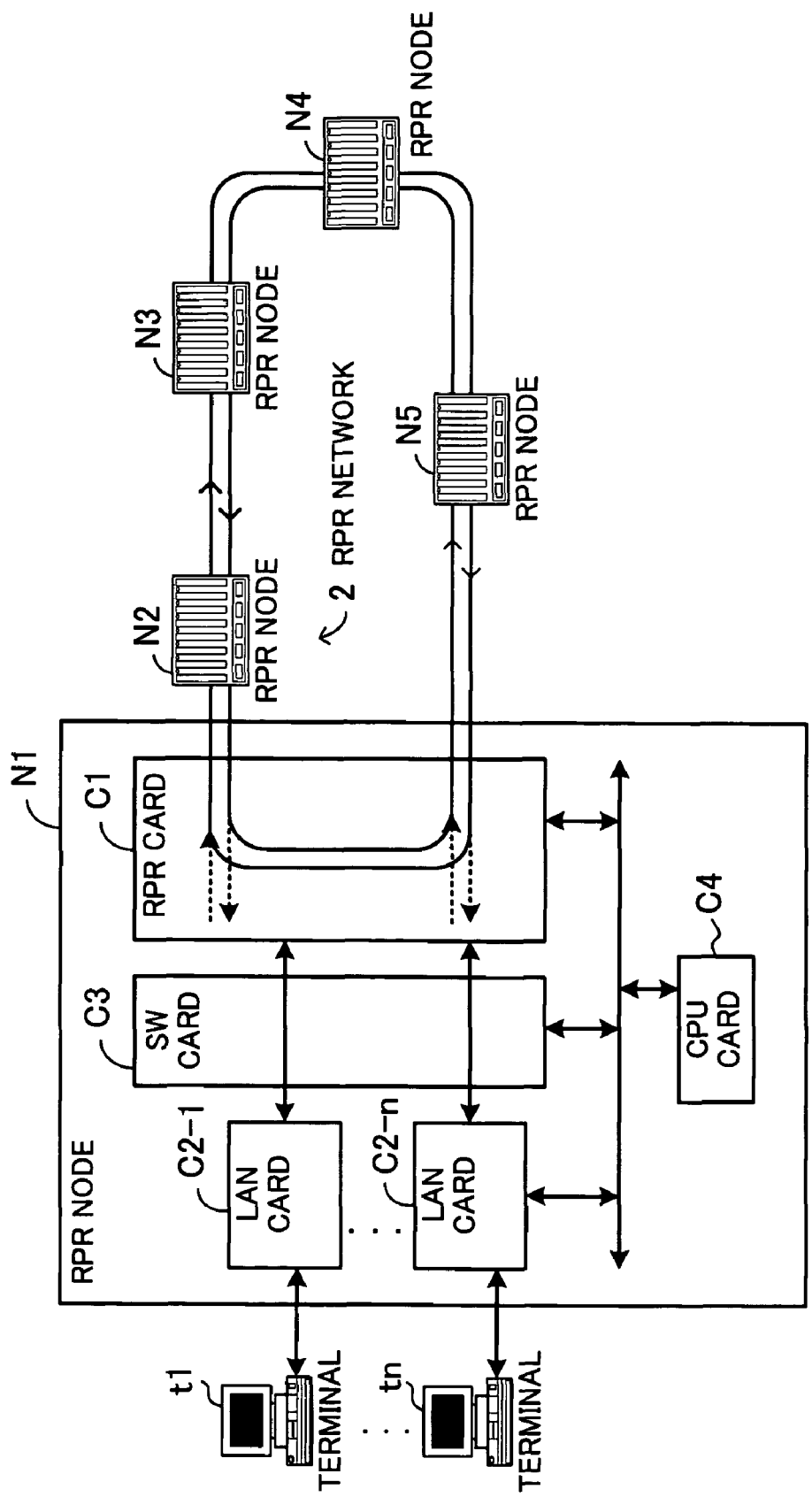
FIG. 2 shows configurations of an RPR network and a node.

FIG. 2 shows configurations of an RPR network and a node. Nodes (hereinafter, referred to as RPR nodes) N1 to N5 are networked in a ring topology, and the tributary side of the RPR node N1 (packet transmission apparatus) is connected to terminals t1 to tn. Each RPR node N1 to N5 has the processing functions of the first node 10a and the second node 10b, which are described above with reference to FIG. 1. FIG. 2 shows only an internal configuration of the RPR node N1.

The RPR node N1 has an RPR card C1 (including a MAC layer processor 11 and an RPR layer processor 12) that is connected to the RPR network 2, LAN cards C2-1 to C2-n that are connected to client terminals t1 to tn, a switch (SW) card C3 for controlling packet transfer between the RPR card C1 and the LAN cards C2-1 to C2-n, and a CPU card C4 for controlling control information.

FIG. 3 shows a block diagram of the RPR node. The RPR card C1 of the RPR node N1 has PHY units 13-1 and 13-2, an MAC layer processor 11, an RPR layer processor 12, and an address translation table (hereinafter, referred to as VLAN translation table) T1.

The PHY units 13-1 and 13-2 function as physical layer interfaces. It should be noted that the RPR network has a dual ring structure and therefore a PHY unit for transmission and reception is provided for each transmission direction, that is, for each of an east side and a west side.

The RPR layer processor 12 has the processing functions of the RPR layer transmission processor 12a and the RPR layer reception processor 12b, which are described above with reference to FIG. 1, and is designed to process a packet at the RPR layer. The VLAN translation table T1 is used for translating between a VLAN ID and an MAC address (this will be described later with reference to FIG. 4). The MAC layer processor 11 has the processing functions of the MAC layer reception processor 11a and the MAC layer transmission processor 11b, which are described above with reference to FIG. 1, and is designed to process a packet at the MAC layer.

A SW unit 21 included in the SW card C3 performs packet exchange (switching) in packet transfer between the cards. A CPU unit 22 included in the CPU card C4 controls setting of each card via a CPU bus 23 (the CPU unit 22 may control the setting by establishing one-to-one connection with each card, not via the CPU bus 23, and therefore the CPU bus 23 is not always necessary). A LAN card C2 is connected to a terminal t that is capable of transmitting/receiving Ethernet frames, and is designed to function as a transmission/reception interface for the Ethernet frames.

FIG. 4 shows a VLAN translation table T1. The VLAN translation table (address translation table) T1 is a table that is used for translating between a VLAN ID (0 to 4095) and a MAC address (hereinafter, referred to as RPR MAC address), for example, a multicast address. VLAN IDs and RPR MAC addresses have one-to-one correspondence.

The reason why multicast addresses are used as RPR MAC addresses is because confusion should be avoided between the RPR MAC addresses and MAC addresses that are unique to are generally used for personal computers, terminals or RPR nodes in the VLAN 3.

In addition, validity that is equivalent to a flag described above with reference to FIG. 1 shows whether a VLAN ID is valid or invalid. Validity=1 means that an own RPR node belongs to a VLAN domain with a VLAN ID. Referring to FIG. 4, an RPR node provided with this VLAN translation table T1 belongs to VLAN domains with VLAN ID=1, 2. It should be noted that VLAN IDs are represented by decimal numbers and RPR MAC addresses are represented by hexadecimal numbers.

In addition, as described above, an RPR MAC address is to be added by a transmission source node, so as to allow a receiving node to know which VLAN an incoming RPR packet is addressed to. Information to be added by the transmission source node is not limited to such RPR MAC addresses, provided that the RPR layer processor of the receiving node can identify based on the information a virtual network (VLAN) that an incoming RPR packet is addressed to.

Figure 5:
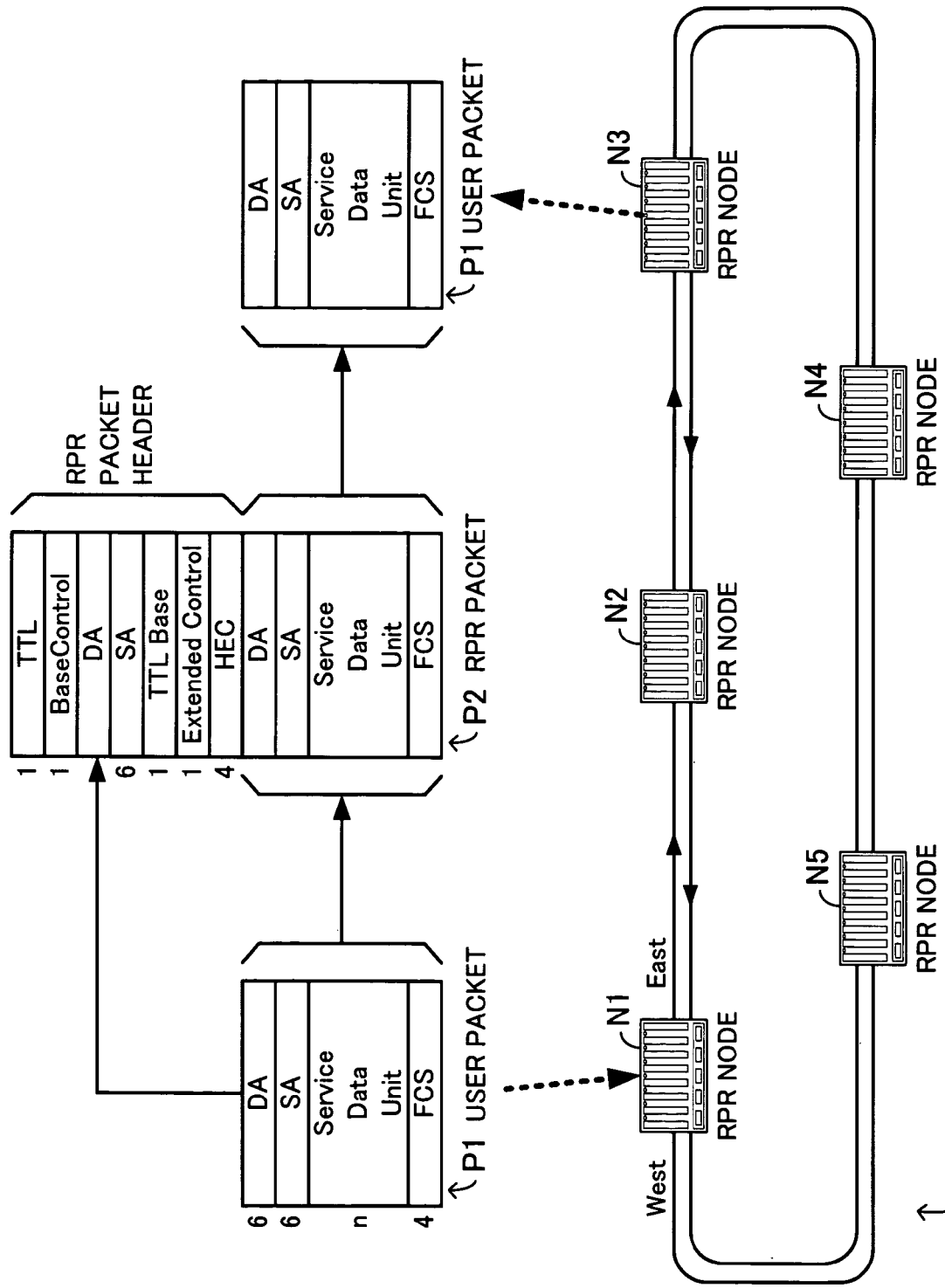
FIG. 5 shows a format of a user packet that goes around the RPR network.

A packet format of a packet to be forwarded on the RPR network 2 will be described now. FIG. 5 shows a format of a user packet that goes around an RPR network. FIG. 5 shows how a user packet that is not a VLAN packet is converted into an RPR packet and goes around the RPR network 2.

A user packet P1 of FIG. 5 is in a general Ethernet frame format and is transmitted from a terminal (not shown) connected to the RPR node N1.

Each numerical value on the left side of the illustrated packet format indicates a field length by number of bytes. For example, a destination address (DA) field is 6 bytes and a Service Data Unit field is n (variable) bytes.

Given an RPR header, the user packet P1 is converted into an RPR packet P2 which then goes around the ring from the RPR node N1.

The fields of an RPR packet header will be described. The maximum 255 is set in a Time To Live (TTL) field. One is subtracted from a TTL value every time the RPR packet P2 passes through an RPR node, and when TTL=0, the packet is removed from the ring.

A BaseControl field is a control information field and contains a broadcast address (all 1) during normal flooding. The DA field contains a destination MAC address, and the destination address of the normal user packet P1 is stored therein as it is.

A Source Address (SA) field contains a transmission source MAC address, and the MAC address of the transmission source node of the normal RPR packet is stored therein. A TTL Base field stores an initial TTL value, and this value is not changed even when the packet passes through an RPR node. An Extended Control field is an extended control information field. A Header Error Control (HEC) field stores HEC information of the fields from TTL to Extended Control.

Then from a DA field to a FCS field, following the HEC field, the user packet P1 is contained, thereby creating the RPR packet P2. The RPR packet P2 goes around the ring via RPR nodes while its TTL value is decreased by each node one by one.

When taking in the RPR packet P2, the RPR node N3 deletes the RPR packet header from the RPR packet P2 to reproduce the user packet P1 and transmits this packet to each terminal connected to the RPR node N3. This packet forwarding allows the user packet to go around the RPR network 2.

After going around the ring, the RPR packet P2 returns to the RPR node N1. Since the SA field of the RPR header carries the own node MAC address, the RPR node N1 regards this RPR packet as being originally transmitted by the own node, and therefore removes (destroys) the packet from the ring.

Figure 6:
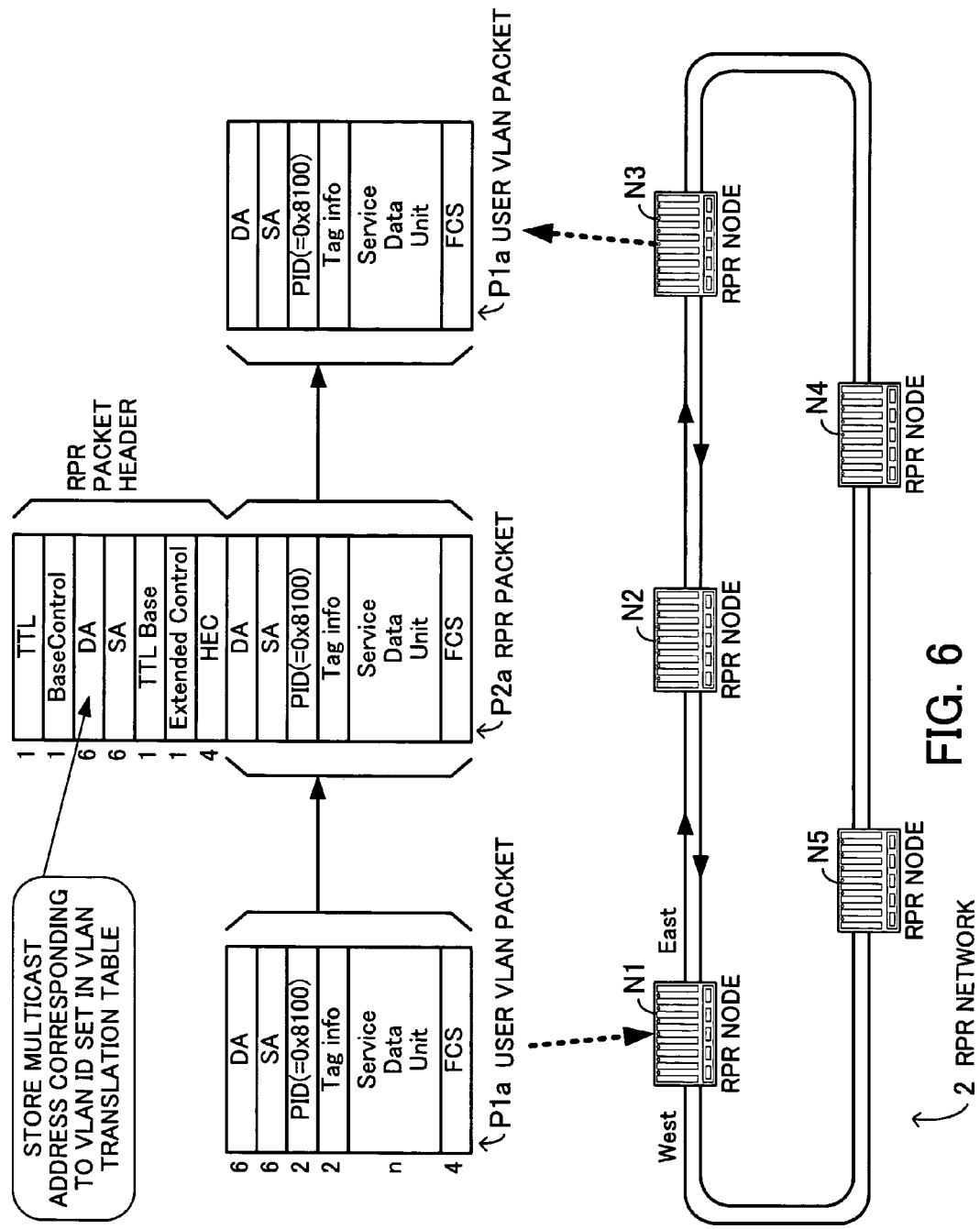
FIG. 6 shows a format of a VLAN packet that goes around the RPR network.

FIG. 6 shows a format of a VLAN packet that goes around the RPR network. FIG. 6 shows a case where a user packet P1 is a VLAN packet including a virtual network identifier.

An RPR node serving as a node composing the ring network encapsulates the incoming user packet P1 and a header having the identifier of a forwarding destination node corresponding to its destination address, and transmits the packet to the ring.

In accordance with this invention, in a case where the user packet P1 is a VLAN packet, a MAC multicast address (RPR MAC address) corresponding to the VLAN ID is stored in the RPR header as identification information of the VLAN.

The user VLAN packet (VLAN packet) P1a has a frame format of the IEEE standards where a Protocol ID (PID) field with 0x8100 follows the DA and SA fields. Then a TAG information field comprising VLAN ID (12 bits), Priority (3 bits) and CFI (1 bit) areas follows the PID field.

When the RPR node N1 creates an RPR packet, the RPR layer processor 12 checks the PID of the user VLAN packet P1a, and regards the packet as a VLAN packet if PID=0x8100, and detects a VLAN ID from the Tag information.

Based on the detected VLAN ID, the RPR layer processor 12 consults the VLAN translation table T1 for a corresponding RPR MAC address and validity. If validity=0, meaning that the VLAN ID is invalid, the packet is not converted into an RPR packet but is destroyed. If validity=1, meaning that the VLAN ID is valid, on the contrary, an RPR packet is created with the RPR MAC address corresponding to the VLAN ID, which is detected from the table, set in the DA field of the RPR header. Then the RPR packet P2a is transmitted to the RPR network 2 with TTL=255.

The RPR packet P2a transmitted to the RPR network 2 is received by all RPR nodes in order. Upon reception of the RPR packet, each RPR node consults the VLAN translation table T1 based on the RPR MAC address stored in the DA field of the RPR header.

If validity=1 is detected for the RPR MAC address, meaning that the packet is addressed to a VLAN domain to which the own node belongs, the RPR layer processor 12 deletes the RPR packet header and passes the reproduced user packet to the MAC layer processor 11.

If validity=0 is detected for the RPR MAC address, meaning that the packet is unrelated to the own node, on the contrary, the RPR layer processor 12 does not pass this packet to the MAC layer processor 11.

In addition, the RPR layer processor 12 checks the SA and TTL fields of the RPR header. If the SA field does not carry the MAC address of the own node and the TTL subtraction results in TTL≠0, the RPR packet is forwarded on the ring.

The RPR packet goes around the ring and finally returns to the RPR node N1 where the SA field of the RPR header is checked and SA=own node MAC address is confirmed. Therefore, the RPR packet is removed and destroyed from the ring.

The operation of each constituent element of the packet transmission system 1 will be now described with reference to FIG. 3.

A LAN card C2 receiving a packet from the terminal t of FIG. 3 gives the packet to the RPR card C1 via a SW unit 21. The RPR card C1 gives the received packet to the RPR layer processor 12 via the MAC layer processor 11.

The RPR layer processor 12 checks the PID of the received packet. If PID≠0x8100, then the RPR layer processor 12 regards this packet as not a VLAN packet and destroys the packet. If PID=0x8100, on the contrary, the RPR layer processor 12 regards the packet as a VLAN packet and detects a VLAN ID.

The RPR layer processor 12 searches the VLAN translation table T1 based on the detected VLAN ID. The VLAN translation table T1 has contents like those described with reference to FIG. 4. If validity=0 is detected in association with the VLAN ID, the RPR layer processor 12 determines that the VLAN packet is unrelated and destroys this packet. If validity=1 is detected in association with the VLAN ID, the RPR layer processor 12 creates an RPR packet with a corresponding RPR MAC address set in the DA field of the RPR header. At this time, the MAC address of the own node is stored in the SA field of the RPR header and 255 (maximum) is set in the TTL field.

In addition, for every RPR node, it is previously determined whether a created RPR packet is transmitted to the east side or the west side of the RPR network 2. For example, in designing the network, the east side is set for the RPR node N1 and the west side is set for the RPR node N2.

After creating the RPR packet, the RPR layer processor 12 gives the RPR packet to a PHY unit 13-1 or 13-2 according to the above setting. The RPR packet transmitted to the RPR network 2 is successively received by the nodes on the ring.

Specifically, in each RPR node, the RPR packet received via the PHY unit 13-1 or 13-2 is given to the RPR layer processor 12. The RPR layer processor 12 checks the SA field of the RPR header. If the SA field carries the MAC address of the own node, the RPR layer processor 12 confirms that the packet has returned after going around the ring, and destroys the packet. If the SA field does not carry the MAC address of the own node, the RPR layer processor 12 searches the VLAN translation table T1 based on the RPR MAC address stored in the DA field.

If validity=0 is detected for the RPR MAC address, the RPR layer processor 12 regards the packet as being unrelated to the own node, and forwards the packet on the ring again, without passing the RPR packet to the MAC layer processor 11. If validity=1 is detected for the RPR MAC address, the RPR layer processor 12 identifies the packet as being addressed to the VLAN 3 to which the own node belongs, and deletes the RPR header from the RPR packet and passes the packet to the MAC layer processor 11.

The packet received by the MAC layer processor 11 is given to the LAN card C2 via the SW unit 21 and then transmitted to the terminal t. In a case where a node trouble or a circuit trouble occurs in the RPR network 2, a trouble detecting node drives Wrapping protection, as in a conventional case, thereby setting a diversion on the ring and keeping PRP packet transfer to all RPR nodes on the RPR network 2.

As described above, the RPR layer processor 12 is capable of detecting from an RPR packet itself (header thereof) a VLAN ID of the packet. Therefore, only VLAN packets addressed to the VLAN 3 to which an own node belongs are given to the MAC layer processor 11, resulting in reducing processing loads on the MAC layer processor 11. That is to say, a MAC layer processor 11 of an RPR node requires only processing capability according to an amount of VLAN packets to be essentially processed. Further, apparatus can be realized at reduced costs.

The first to seventeenth structural and operational modifications of the packet transmission system 1 will be now described in detail. The first modification allows the RPR layer processor 12 of each RPR node to set a desired VLAN PID as a PID specifying VLAN packets.

Figure 7:
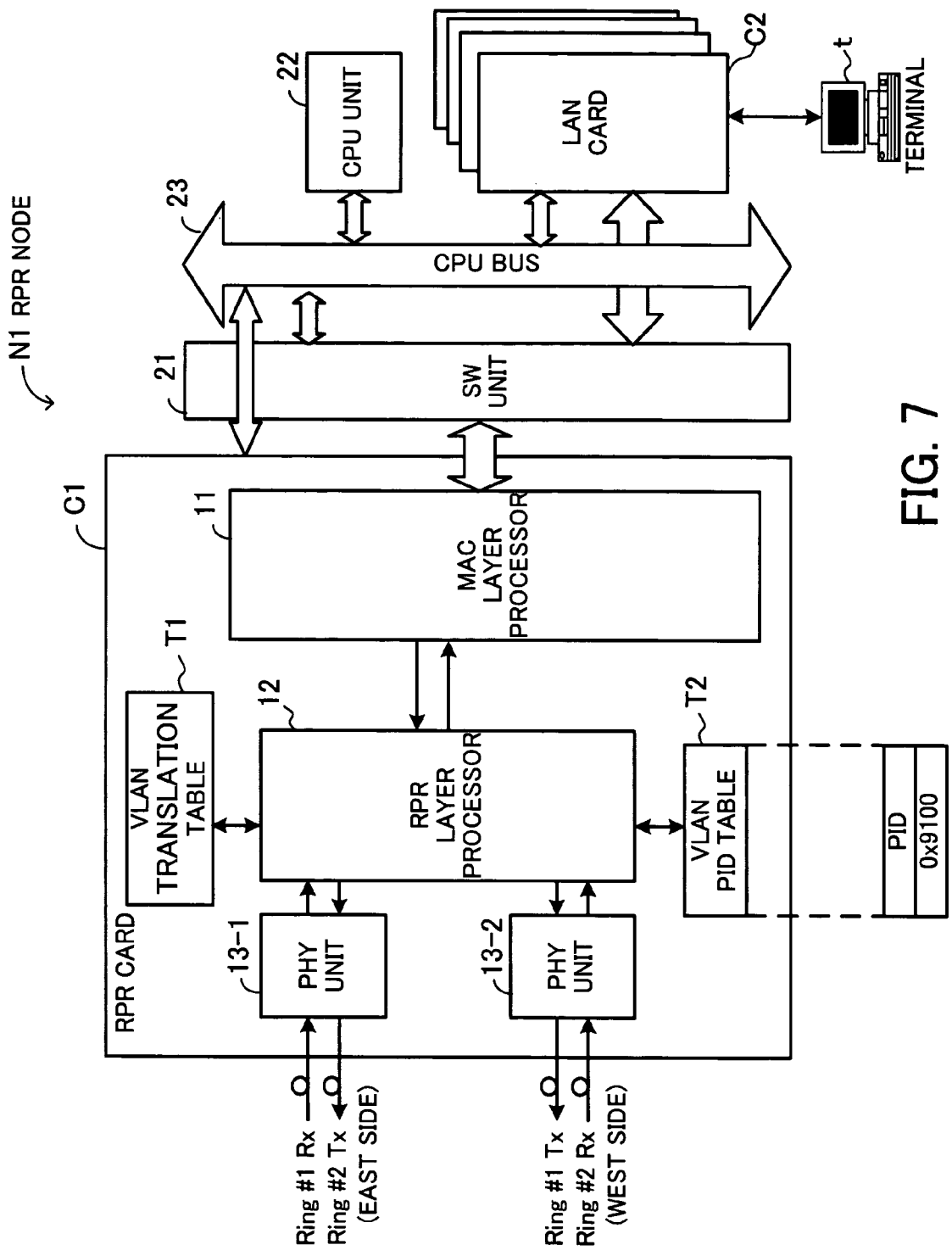
FIGS. 7 to 9 show an RPR node having a VLAN PID table.

FIG. 7 shows an RPR node having a VLAN PID table. The RPR node N1 has a new VLAN PID table T2 that is connected to the RPR layer processor 12 (the VLAN PID table T2 may be included in the RPR layer processor 12). The VLAN PID table T2 contains a PID to be used for determining whether a packet received via the LAN card C2 is a VLAN packet.

The RPR node N1 of FIG. 3 having a fundamental structure of this invention automatically regards a packet as a VLAN packet of the IEEE standards if its PID is 0x8100. In this first modification, the packet is identified as a VLAN packet if the PID of the packet exists in the VLAN PID table T2. Referring to FIG. 7, the table contains PID=0x9100.

When receiving a packet via the MAC layer processor 11, the RPR layer processor 12 compares the PID of the received packet with the stored PID of the VLAN PID table T2. If they match, the RPR layer processor 12 regards the packet as a VLAN packet and creates an RPR packet. If they do not match, the RPR layer processor 12 determines that the packet is not a VLAN packet and destroys the packet.

FIG. 7 shows a case where, if a packet coming from the MAC layer processor 11 has PID=0x9100, the packet is identified as a VLAN packet. This first modification enables using terminals or devices that have a function of transmitting/receiving a VLAN packet with a PID other than 0x8100 of the IEEE standards.

The second modification will be now described. This modification enables setting of a plurality of VLAN PIDs based on which the RPR layer processor 12 of each RPR node specifies VLAN packets.

Figure 8:
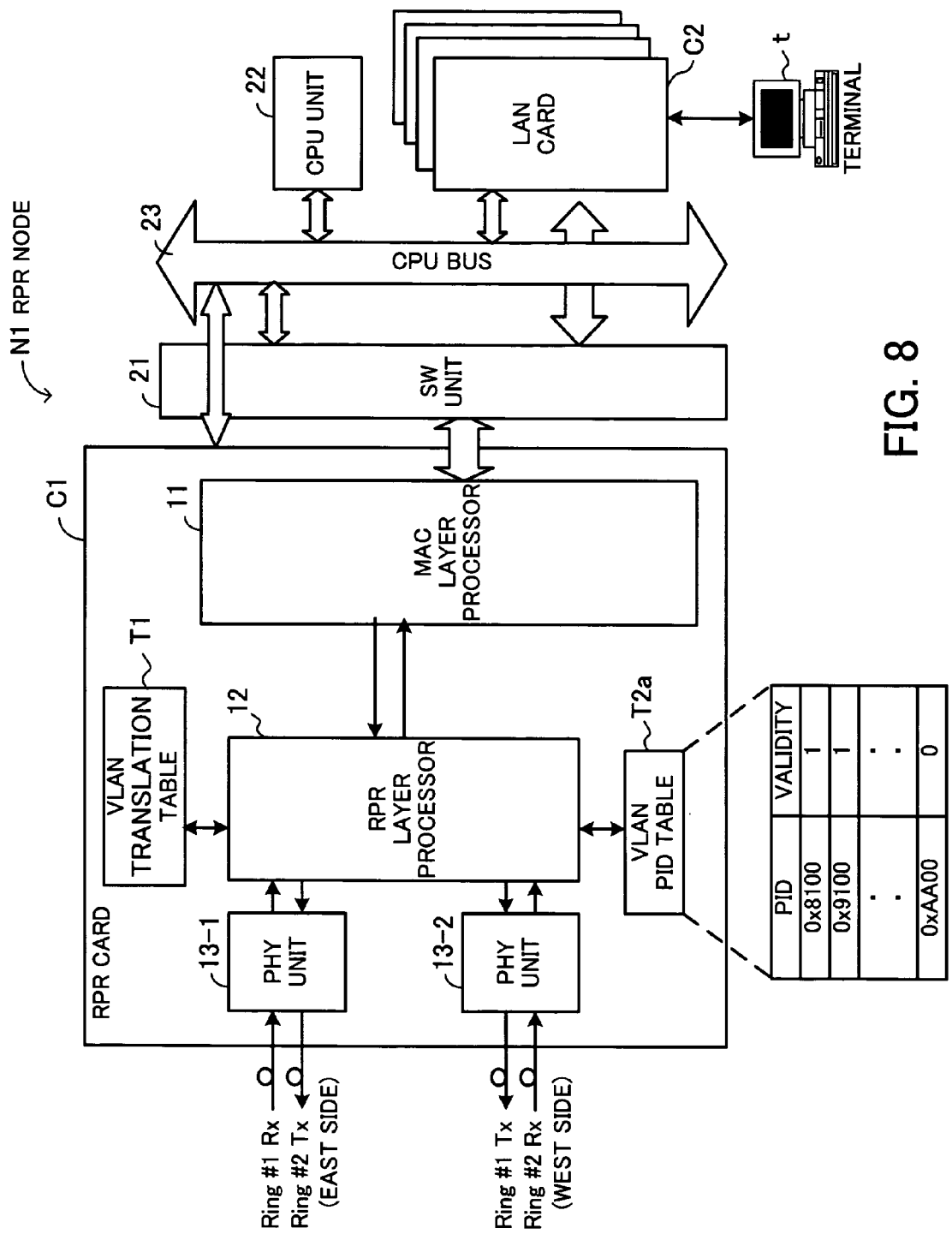

FIG. 8 shows an RPR node having a VLAN PID table. The RPR node N1 has a different VLAN PID table T2a that is connected to the RPR layer processor 12. The VLAN PID table T2a is a table allowing a plurality of different PIDs to be used for VLAN packets, and a plurality of PIDs and their validity can be set in this table T2. Validity=1 means that a PID is valid while validity=0 means that a PID is invalid. FIG. 8 shows that two PIDs, 0x8100 and 0x9100, are valid as PIDs of VLAN packets.

When receiving a packet via the MAC layer processor 11, the RPR layer processor 12 compares the PID of the received packet with the PIDs in association with validity=1 in the VLAN PID table T2a, and if they match, the RPR layer processor 12 regards the packet as a VLAN packet and creates an RPR packet. If they do not match, the RPR layer processor 12 determines that the packet is not a VLAN packet and destroys the packet.

As described above, the second modification enables setting a plurality of PIDs for VLAN packets, thus making it possible to connect a node to terminals or devices that have a function of transmitting and receiving VLAN packets with other PIDs as well as with PID=0x8100, which is under the IEEE standards.

The third modification will be now described. This modification provides a VLAN PID table for setting a plurality of different PIDs for a VLAN ID via offset values, the PIDs specifying VLAN packets.

Figure 9:
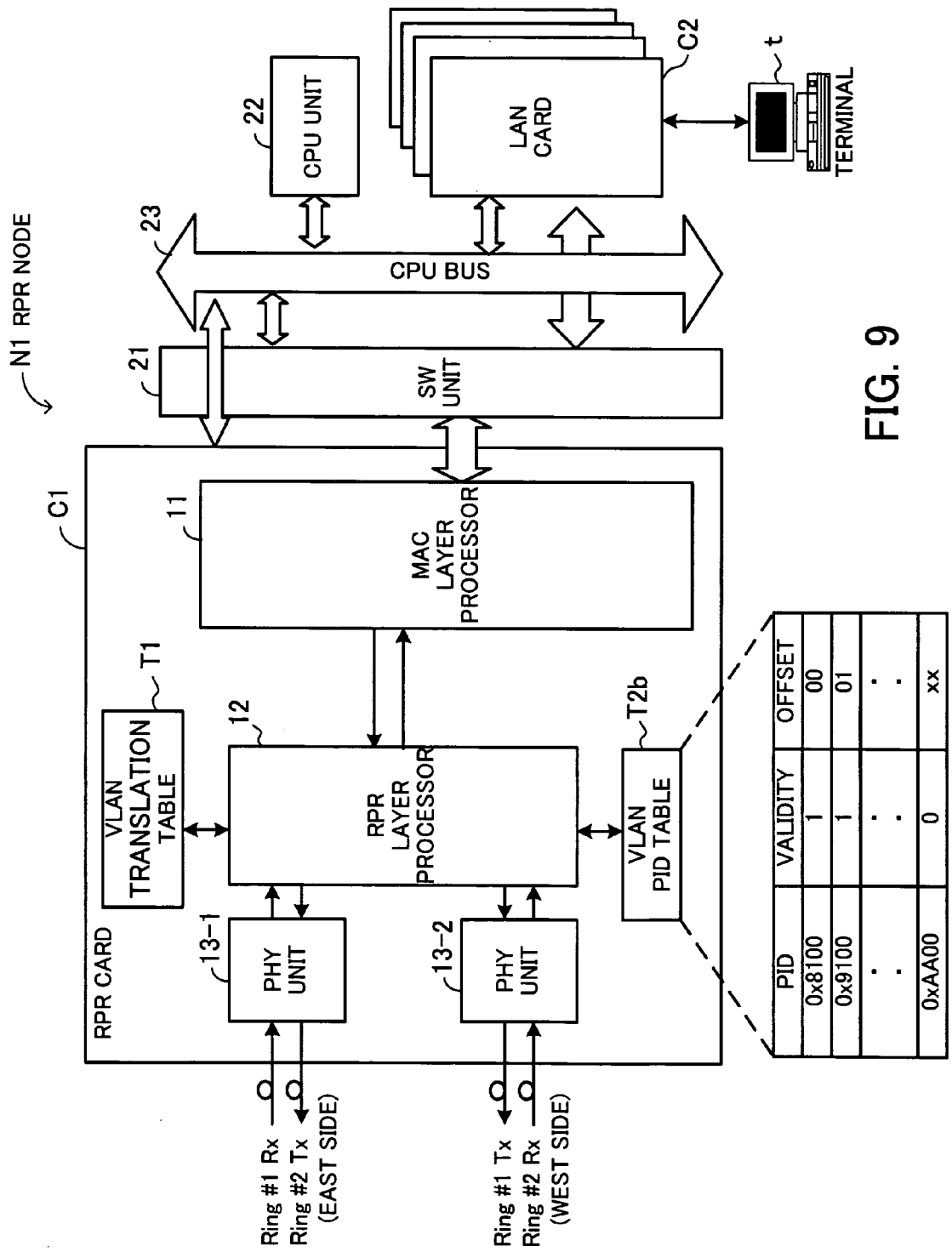

FIG. 9 shows an RPR node having a VLAN PID table. The RPR node N1 has a different VLAN PID table T2b that is connected to the RPR layer processor 12.

According to the second modification, in a case where a packet with VLAN PID=0x8100 and a packet with VLAN PID=0x9100 use identical VLAN IDs, the VLAN packets with the different VLAN PIDs are regarded as having the same VLAN ID. Therefore, if packets with different VLAN PIDs and with identical VLAN IDs are desired to be treated as belonging to different VLANs, the identical IDs should not be used in the network.

The third modification, on the other hand, provides the VLAN PID table T2b where offset values can be additionally set. The offset values indicate offset values set in a VLAN translation table (described later with reference to FIG. 10), which enables bank segmentation of the VLAN tables based on the offset values.

FIG. 10 shows a VLAN translation table T1a where offset values are additionally set. Referring to FIG. 10, offset values=00 and 01 are set to be compatible with the setting example of the VLAN PID table T2b of FIG. 9.

For example, VLAN ID=0 can be set in association with different RPR MAC addresses (PID=0x8100 and PID=0x9100) via offset values=00 and 01 in the VLAN translation table T1a.

Referring to FIG. 9, when receiving a packet via the MAC layer processor 11, the RPR layer processor 12 compares the PID of the received packet with the PIDs set in the VLAN PID table T2b to extract a corresponding offset value, and searches the VLAN translation table T1a of FIG. 10 based on the extracted offset value and the VLAN ID of the packet, and then creates an RPR packet with the found RPR MAC address set in the DA field of the RPR header.

As described above, the third modification enables using identical VLAN IDs for VLAN packets having different VLAN PIDs. For example, in a case where different VLANs of an office A and an office B are networked on an RPR network, different VLAN PIDs are allotted to them on the network, so that the RPR LAN allows the offices A and B to use identical VLAN IDs in their intranets without problems.

The fourth modification will be now described. This modification provides a function of controlling destruction of untagged packets that do not have tag information of VLAN ID. If an untagged packet is not destroyed, a predetermined destination address of RPR packets is allotted to the packet. As a result, the RPR layer processor 12 of each RPR node can forward such untagged packets and tagged packets similarity.

Figure 11:
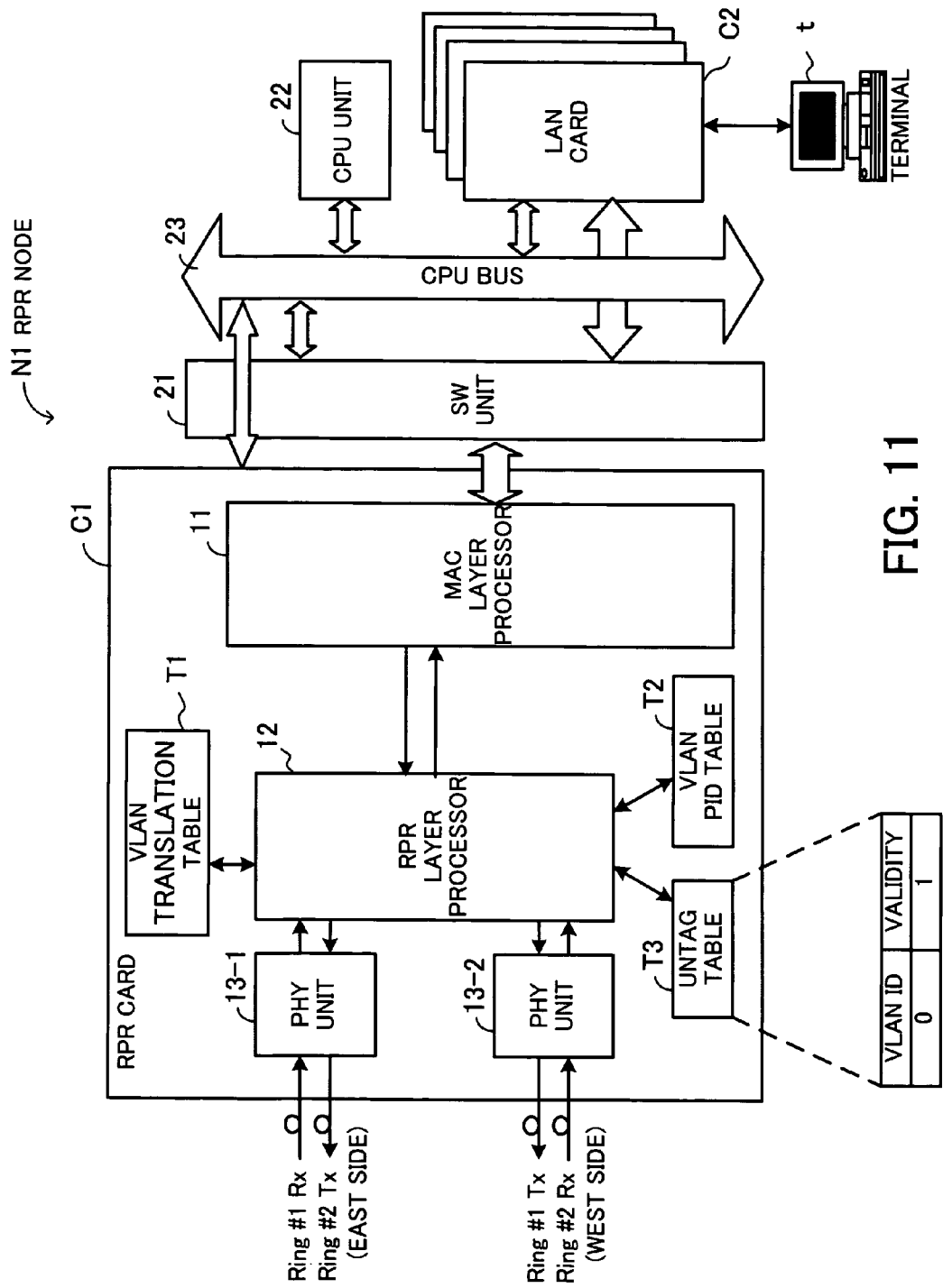
FIG. 11 shows a configuration of an RPR node having an untag table.

FIG. 11 shows the configuration of an RPR node having an untag table. The RPR node N1 has a new untag table T3 that is connected to the RPR layer processor 12. Packets (packets without VLAN tags) other than VLAN packets are generally called untagged (without tag) packets, differently from VLAN packets. The fourth modification allows such untagged packets, which do not have VLAN tags, to be transferred in the VLAN 3 on the RPR network 2.

In the previous modifications, an untagged packet received by the RPR layer processor 12 via the MAC layer processor 11 is not regarded as a VLAN packet and is destroyed. In the fourth modification, the untag table T3 is newly provided so that a temporary VLAN ID is allotted to an untagged packet. If validity=0, an untagged packet is destroyed. If validity=1, a VLAN ID set in the table is used for the untagged packet and then the VLAN translation table T1 is searched.

In the untag table T3 of FIG. 11, VLAN ID=0. The VLAN translation table T1 is referenced by assuming that the untagged packet has VLAN ID=0, and an RPR packet is created with an RPR header having a corresponding RPR MAC address set in the DA field thereof, and is transmitted to the RPR network 2.

An RPR node receiving this RPR packet checks the DA field of the RPR header and if validity=1 is detected from the VLAN translation table T1, regards the untagged packet as being receivable and passes the packet to the MAC layer processor 11.

As described above, according to the fourth modification, in the VLAN 3 on the RPR network 2, an untagged packet can be processed at the RPR layer, as in the case of a VLAN packet. In addition, since individual RPR nodes can determine based on validity set in the untag table T3 whether to process an untagged packet. As a result, a flexible RPR VLAN configuration can be realized.

The fifth modification will be now described. The fifth modification prevents RPR packets from going around a ring many times, in such a manner that "TTL=(the number of RPR nodes-1)" is set at the time of forwarding an RPR packet and an RPR node that detects TTL=0 destroys the packet.

In the fifth modification, the RPR layer processor 12 sets "TTL=(the number of RPR nodes-1)" when creating an RPR packet. In addition to checking the SA field of the RPR header, the RPR packet is destroyed and removed from the ring if an RPR node finds that the TTL subtraction results in TTL=0.

Figure 21:
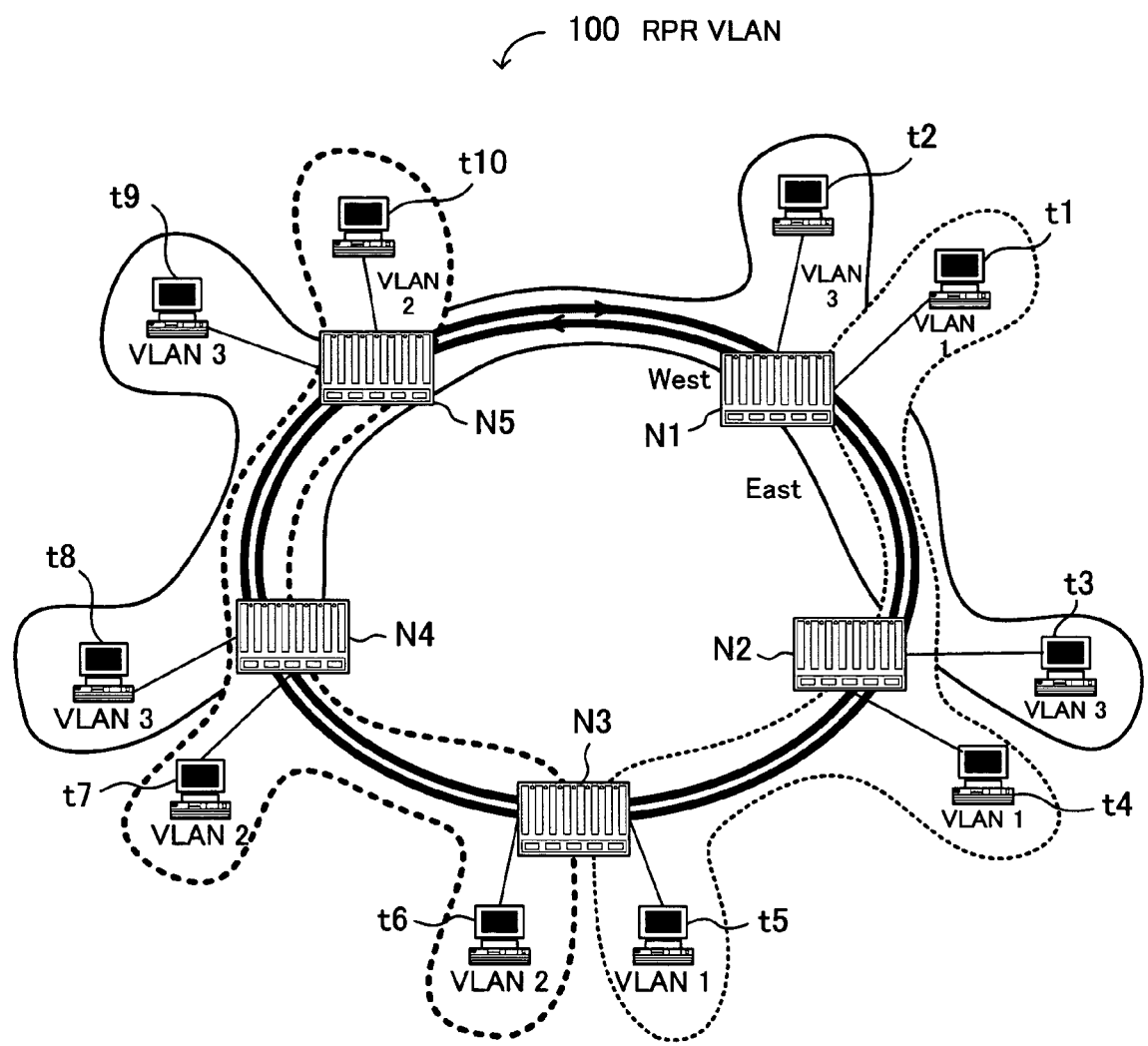
FIG. 21 shows arrangement of RPR VLANs.

For example, referring to FIG. 21, the node N1 transmits an RPR Packet with TTL=4 to the east side. The RPR packet is received by each node N2 to N5 where the packet is transmitted to the ring again after the TTL value is changed. The node N5 detects TTL=0 by the TTL subtraction, confirms that the packet has traveled around the ring, and destroys the packet without forwarding it on the ring. As described above, according to the fifth modification, even if the SA field of the RPR header changes its address due to bit garble in the ring and a transmission source node cannot confirm that the RPR packet was originally transmitted from the own node, the RPR packet can be prevented from circulating many times by performing the TTL subtraction and value check.

The sixth modification will be now described. This modification determines whether an RPR packet is transmitted to the east side or the west side by performing a hash operation on a specified region of a packet.

In this modification, the RPR layer processor 12 performs the hash operation on the specified region of a packet. The specified region is an address region of a packet (for example, the DA and SA fields that are a part of user packet). The hash operation comprises division of the above address region with a generating polynomial, to obtain a reminder. Here, a generating polynomial that produces 0 or 1 as a reminder is prepared so as to select one of the east side and the west side.

The RPR layer processor 12 performs the hash operation (division) using the generating polynomial on the address region of a packet received via the MAC layer processor 11, to obtain a reminder=0 (east side) or =1 (west side), thereby controlling a packet transmission direction based on the reminder.

According to the sixth modification, individual RPR nodes do not transmit RPR packets to predetermined transmission directions but can select a transmission direction packet by packet.

The seventh modification will be now described. In this modification, RPR packets are transmitted to the east side or the west side based on a VLAN ID. FIG. 12 shows a VLAN translation table.

The VLAN translation table T1b has an East field and a West field that specify which direction an RPR packet is transmitted to, so that the RPR layer processor 12 can determine a transmission direction of an RPR packet based on a VLAN ID.

An RPR packet is designed to be transmitted to an east side or a west side, whichever has 1. For each VLAN ID, the East field or the West field is exclusively, not simultaneously, set to 1.

Referring to the table setting of FIG. 12, RPR packets with VLAN ID=0, 1 are to be transmitted to the east side. RPR packets with VLAN ID=2, 3, are to be transmitted to the west side. The East field and the West field are referenced at the time of creating an RPR packet and are not necessarily referenced at the time of receiving an RPR packet from the ring.

The eighth modification will be now described. In this modification, a VLAN address table has East and West fields and a hash field in association with each VLAN ID, so that a transmission direction of an RPR packet can be decided with the hash operation at the time of forwarding the RPR packet.

FIG. 13 shows a VLAN translation table. The VLAN translation table T1c has a hash field in addition to the table structure of FIG. 12, thereby enabling selecting a transmission direction of an RPR packet with the hash operation depending on a VLAN ID. The hash field of 1 means that the hash operation is performed on an address region of an RPR packet with the VLAN ID, in order to determine a transmission direction, the east side or the west side.

For each VLAN ID, the East field, the West field, or the hash field is exclusively, not simultaneously, set to 1. Referring to the table setting of FIG. 13, RPR packets with VLAN ID=0, 1 are to be transmitted to the east side, RPR packets with VLAN ID=2 are to be transmitted to the west side, and RPR packets with VLAN ID=3 are transmitted to the east side or the west side depending on a result of the hash operation.

It should be noted that the East field, the West field, and the hash field of the VLAN translation table T1c are referenced at the time of creating an RPR packet, and are not necessarily referenced at the time of receiving an RPR packet from the ring.

As described above, the eighth modification provides determination of a transmission direction based on a VLAN ID with a degree of freedom. Especially, for VLAN IDs which have a large amount of packets to be transmitted, a transmission direction is determined with the hash operation, which can avoid packet transmission biased toward one transmission direction.

The ninth modification will be now described. In the ninth modification, a plurality of hash operators for the hash operation is provided to determine a transmission direction by selecting and using one of the plurality of hash operators.

FIG. 14 shows a VLAN translation table. In the VLAN translation table T1d, a plurality of hash operators are provided for the hash operation, to allow a hash operator to be selected for each VLAN. The hash operation of this case is performed in order to select a transmission direction, the east side or the west side, packet by packet. Therefore, the plurality of hash operators which produce a binary (0 or 1) as an operation result are prepared.

A hash field of 0 means that the hash operation is invalid for a VLAN, while a hash field of 1 or greater means that the hash operation is valid. For each VLAN ID, the East field, the West field, or the hash field is exclusively, not simultaneously, set valid.

Referring to the table setting of FIG. 14, RPR packets with VLAN ID=0 are to be transmitted to the east side, RPR packets with VLAN ID=1 are to be transmitted to the west side, RPR packets with VLAN ID=2 are to be transmitted to the east side or the west side depending on a result of the hash operation using a hash operator of operator number 1, and RPR packets with VLAN ID=3 are to be transmitted to the east side or the west side depending on a result of the hash operation using a hash operator of operator number 2.

According to the ninth modification, a plurality of hash operators are prepared, thereby preventing biased transmission by rewriting hash operator numbers of the table in a case where biased operation results are obtained for VLAN packets and therefore RPR packet transmission is biased to the east side or the west side.

The tenth modification will be now described. In this modification, the TTL value of an RPR packet is optimized depending on VLANs to which an RPR node on the RPR network belongs, thereby realizing efficient packet transmission while avoiding unnecessary travel of the packet on the ring.

FIG. 15 shows a VLAN translation table. The VLAN translation table T1e has new TTL (East) field and TTL (West) field. The TTL (East) field contains a value to be stored in the TTL field of an RPR packet header when the RPR packet is transmitted to the east side. Similarly, the TTL (West) field contains a value to be stored in the TTL field of an RPR packet header when the RPR packet is transmitted to the west side.

The VLAN translation table T1e of FIG. 15 shows a setting example of the VLAN translation table for the node N1 having the RPR VLAN configuration shown in FIG. 21. The node N1 belongs to VLANs with VLAN ID=1 and VLAN ID=3. Therefore, validity=1 is set only for VLAN ID=1 and VLAN ID=3. In a node N1 point of view, a packet of VLAN ID=1 may be forwarded only to the node N2 and the node N3. The packet may not be forwarded to the node N4 and the node N5.

Therefore, as to forwarding of the RPR packet with LAN ID=1, East=1, TTL (East)=2, and West=0 are set for VLAN ID=1 in the VLAN translation table T1e, so as to transmit the RPR packet with TTL=2 to the east side which realizes the shortest forwarding route.

Thereby the RPR packet with VLAN ID=1 is transmitted to the east side, and then the RPR layer processor 12 of the node N2 gives the packet to the MAC layer processor 11 and performs the TTL subtraction, and then transmits the RPR packet to the east side.

Then, the RPR layer processor 12 of the node N3 passes the packet to the MAC layer processor 11 since the packet has the VLAN ID to which the own node belongs. In addition, the TTL subtraction results in TTL=0, and thus the RPR packet is not transmitted to the east side.

As a result, the RPR packet with VLAN ID=1 transmitted from the node N1 to the ring is forwarded from the node N1 via the node N2 to the node 3 on the ring, and does not go through the other routes, which can prevent consuming the bandwidth of a route of node N3-node N4-node N5-node N1 on the east side. Consider a case of transmitting an RPR packet with VLAN ID=3 from the node N1. The packet should go around the ring either from the east side or from the west side because the node 2 being adjacent on the east side and the node N5 being adjacent on the west side both belong to VLAN ID=3. Here, West=1 and TTL (West)=4 are set, so as to transfer the RPR packet to the nodes N2, N4 and N5 from the west side.

As described above, according to the tenth modification, an RPR packet can be forwarded in a more effective way by setting a transmission direction (east side or west side) and a TTL value according to the VLAN configuration on the RPR network 2.

The eleventh modification will be now described. Besides a TTL value is set according to the VLAN configuration on the RPR network, this eleventh modification enables setting a transmission direction with the hash operation, depending on a VLAN ID at the time of forwarding an RPR packet.

FIG. 16 shows a VLAN translation table. The VLAN translation table T1f has a hash field in addition to the table structure of FIG. 15. This VLAN translation table T1f of FIG. 16 shows table setting for the node N1 with the RPR VLAN configuration of FIG. 21.

In the tenth modification, as described above, a packet with VLAN ID=3 should go around the ring from either the east side or the west side and the node N1 transmits the packet to the west side by way of example.

In the eleventh modification, a hash field is prepared and the hash operation is performed on a packet with VLAN ID=3 so as to select one of the east side and the west side, thus making it possible to avoid packet transmission biased toward one transmission direction.

Referring to the table structure of FIG. 16, the hash field is set to 1 for VLAN ID=3. In a case where a VLAN packet received via the MAC layer processor 11 has VLAN ID=3, the RPR layer processor 12 performs the hash operation to select a transmission direction.

It should be noted that, for each VLAN ID, the East field, the West field, or the hash field is exclusively, not simultaneously, set valid. In addition, "TTL=(the number of RPR nodes−1)" is set when hash field=1.

The twelfth modification will be now described. This modification enables unidirectional transmission or bidirectional transmission to the RPR network at a time of forwarding an RPR packet, and also realizes efficient forwarding of an RPR packet by setting a TTL value according to the VLAN configuration on the RPR network for each VLAN ID.

FIG. 17 shows a VLAN translation table. The above-described previous modifications are directed to the unidirectional transmission where each RPR packet is transmitted to either the east side or the west side. The twelfth modification also enables the bidirectional transmission where each RPR packet can be transmitted to both the east side and the west side.

In the VLAN translation table T1g of FIG. 17, the East field and the West field both can be set to 1. In a case where these fields have 1, the RPR layer processor 12 transmits an RPR packet to both the east side and the west side. It should be noted that values set in the TTL (East) field and the TTL (West) field are used as TTL values to be stored in the respective RPR headers.

The table structure of FIG. 17 shows a setting example of the VLAN translation table T1g for the node N1 with the RPR VLAN configuration of FIG. 21. For VLAN ID=3, the East field and the West field are both set to 1, and TTL (East)=1 and TTL (West)=2 are set.

Therefore, as to an RPR packet with VLAN ID=3, the node N1 transmits the RPR packet with TTL (East)=1 to the east side and then the node N2 removes the packet from the ring because the TTL value becomes 0.

In addition, the node N1 transmits the RPR packet with TTL (West)=2 to the west side, and the RPR packet goes through the node N5 to the node N4 where the packet is removed from the ring because the TTL value becomes 0.

Therefore, the RPR packet with VLAN ID=3 from the node N1 does not go through a zone from the node N2 to the node N3 and a zone from the node N3 to the node N4. This can avoid uselessly consuming the ring bandwidth of these zones and therefore can realize efficient packet forwarding.

The thirteenth modification will be now described. This modification enables converting a VLAN priority class of a packet to an RPR class.

FIG. 18 shows a class conversion table. The class conversion table T4 is a table for converting eight classes for VLAN packets which are represented by priority bits (three bits), into three classes (A, B, and C) for RPR packets. The RPR class A represents the highest priority (for example, bandwidth guarantee class where, if 10 GBPS is previously guaranteed as transfer capacity, 10 Gbps is always secured even while 10 Gbps is not actually necessary). The class B has a low priority (for example, in a case where bandwidth from 5 Gbps to 20 Gbps is available, the lowest 5 Gbps is always secured even while 5 Gbps is not actually necessary, but bandwidth is allotted depending on traffic when bandwidth of 20 Gbps is required). The class C is the lowest priority (best effort class).

The class conversion table T4 is stored in the RPR layer processor 12. The RPR layer processor 12 consults the class conversion table T4 to convert to an RPR class the priority (eight classes) stored in the Tag Information field of a VLAN packet received via the MAC layer processor 11.

For example, referring to the table structure of FIG. 18, RPR class=B is detected for VLAN priority=3. At this time, an RPR packet is created as a packet of class B. That is to say, a VLAN packet can be classified to an RPR class depending on the priority (class).

The fourteenth modification will be now described. This modification is directed to determining an RPR class of a packet without VLAN tag. FIG. 19 shows a class conversion table. The class conversion table T4a has a conversion field for classifying an untagged packet into an RPR class.

Since untagged packets do not have Tag information, priority information does not exist. Therefore, in a case where a packet received from a MAC layer is an untagged packet and the packet is not destroyed but is converted into an RPR packet, the packet is classified into an RPR class based on the class conversion table T4a. In this example of FIG. 19, an untagged packet is classified into RPR class=C, and thus the packet is converted into an RPR packet of a priority class C.

The fifteenth modification will be now described. This modification enables classifying a packet without VLAN tag into an RPR class and converting the VLAN Priority class of a packet with VLAN tag into an RPR class, and also employs a prescribed class conversion rule on a VLAN ID basis. A plurality of conversion rules are previously set by preparing a plurality of class conversion tables as shown in FIGS. 18 and 19, so as to select an RPR class conversion table on a VLAN ID basis.

FIG. 20 shows a VLAN translation table. The VLAN translation table T1h has a new conversion rule field. For example, two class conversion tables (table 1 and table 2) having different conversion rules are prepared to select one on a VLAN ID basis.

Referring to the table structure of FIG. 20, a class conversion table 1 is selected for VLAN ID=1 and a class conversion table 2 is selected for VLAN ID=3. In this way, different RPR class conversion rules can be used for different VLANs, thus making it possible to realize flexible class conversion on the RPR VLAN.

The sixteenth modification will be now described. This modification shows that a VLAN translation table is not referenced for RPR control packets.

In the IEEE802.17 RPR, different from user packets transmitted from terminals, standard control packets do not have VLAN IDs and are processed at the RPR layer. Therefore, it is designed that a VLAN conversion table is not referenced for RPR control packets but RPR nodes transmit and receive the RPR control packets in an RPR packet format, which is under the standard technology, between their RPR layers. This allows even the RPR nodes employing the processing functions of this invention to enable transmitting/receiving control information such as topology information (network topology information including the number of nodes on an RPR network) and protection information (including information specifying troubling nodes and a direction for transmitting packets due to the troubling nodes).

The seventeenth modification will be now described. This modification is directed to displaying and showing the contents of table information such as a VLAN translation table and a class conversion table of an RPR node to an operator or a network administrator. This seventeenth modification, the VLAN translation table and the class conversion table are accessed via the CPU and their contents are displayed on an administrator terminal screen connected to the RPR node.

The administrator terminal is not necessarily connected directly to an RPR node, but can be located remotely via LAN to display such system information. In addition to display, the administrator terminal can be used for setting and updating VLAN translation tables, etc.

The administrator monitors the contents of the VLAN translation tables and the class conversion tables of the nodes on the RPR network to check validity of the tables, thus making it easy to manage the network.

As described above, according to RPR packet forwarding of this invention, in a case of using an RPR network as a VLAN relay network, the VLAN ID of each RPR packet is detected at the RPR layer, which eliminates necessity for the MAC layer processor to check the VLAN ID of the packet, thereby reducing processing loads on the MAC layer processor and also reducing cost.

In addition, the RPR packet forwarding is performed with taking the VLAN configuration of the RPR network into consideration, thus making it possible to avoid unnecessary travel of RPR packets on the ring and to realize efficient forwarding of the RPR packets.

According to the packet transmission apparatus of this invention, in a case where an incoming packet is a virtual network packet, the first node searches an address translation table based on a virtual network identifier for a corresponding MAC address, creates an RPR packet with the found MAC address stored as an RPR destination address, and transmits the packet to the RPR network. The second node searches the address translation table based on the MAC address stored as the destination address of the RPR packet, and if a corresponding flag is a valid flag, regards the packet as being addressed to the virtual network to which the own node belongs, and transmits the packet to the virtual network after deleting the RPR header. Thereby, the virtual network packet forwarding of the MAC layer can be realized at the RPR layer, thus making it possible to realize high-quality packet transmission with reducing processing loads on the MAC layer.

The foregoing is considered as illustrative only of the principle of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A packet transmission apparatus composing a ring network, the packet transmission apparatus comprising:
   a first-layer processor to process a first packet received from outside of the ring network and to process a second packet to be transmitted to the outside of the ring network;
   a second-layer processor to transmit a third packet received from the first-layer processor to the ring network with a second-layer header added to the third packet, wherein the second-layer header includes information for allowing the third packet to go around the ring network, and to forward a fourth packet received from the ring network on the ring network depending on a second-layer header of the fourth packet or to pass the fourth packet to the first-layer processor after deleting the second-layer header from the fourth packet; and
   an address translation table associating a multicast destination address and a flag in conjunction with a pair of an offset value and a virtual network identifier, the flag indicating whether an own node belongs to a virtual network specified by the virtual network identifier, wherein,
   the second-layer processor has a virtual network Protocol Identifier (PID) table containing a plurality of different PIDs and offset values, each of the plurality of PI Ds being associated with one of the offset values, the plurality of PIDs specifying virtual network packets,
   if the third packet received from the first-layer processor includes a PID and a virtual network identifier, the second-layer processor extracts from the virtual network PID table an offset value corresponding to the PID of the third packet, searches the address translation table based on the extracted offset value and the virtual network identifier of the third packet for a corresponding multicast destination address, and forwards the third packet on the ring network with a second-layer header added to the third packet, the second-layer header including the corresponding multicast destination address, and
   if the fourth packet received from the ring network carries the multicast destination address stored in the address translation table and a corresponding flag indicates that the own node does not belong to the virtual network, the second-layer processor does not pass the fourth packet to the first-layer processor.

2. A packet forwarding method of a packet transmission apparatus composing a ring network, the packet forwarding method comprising:
   receiving from outside of the ring network a packet including a Protocol Identifier (PID) and a virtual network identifier, the PID specifying virtual network packets;
   extracting from a virtual network PID table an offset value corresponding to the PID of the received packet, the virtual network PID table containing a plurality of different PIDs and offset values, each of the plurality of PIDs being associated with one of the offset values;
   searching an address translation table based on the extracted offset value and the virtual network identifier of the received packet for a corresponding multicast destination address, the address translation table associating the multicast destination address and a flag in conjunction with a pair of an offset value and the virtual network identifier, the flag indicating whether an own node belongs to a virtual network specified by the virtual network identifier;
   encapsulating the packet and a header including the corresponding multicast destination address and transmitting the encapsulated packet to the ring network;
   searching the address translation table based on the multicast destination address of the header of the encapsulated packet received from the ring network and determining whether the encapsulated packet includes a virtual network identifier of a virtual network to which the own node belongs;
   if it is determined that the encapsulated packet includes the virtual network identifier of the virtual network to which the own node belongs, decapsulating and transmitting the encapsulated packet to the outside of the ring network; and
   if it is determined that the encapsulated packet does not include the virtual network identifier of the virtual network to which the own node belongs, forwarding the encapsulated packet to a next packet transmission node composing the ring network.

3. A packet transmission system for performing packet transmission with a Resilient Packet Ring (RPR) network forming a bandwidth sharing ring as a backbone, the packet transmission system comprising:
   a first node comprising
   an address translation table associating a multicast Media Access Control (MAC) address and a flag in conjunction with a pair of an offset value and a virtual network identifier, the flag indicating whether the own first node belongs to a virtual network domain with the virtual network identifier, the virtual network identifier identifying a virtual network that is a virtual network group set independently of a physical connection,
   a MAC layer reception processor to perform a reception process on a first packet received from the virtual network formed on the RPR network, and
   an RPR layer transmission processor to determine whether the first packet is a virtual network packet, and if it is determined that the first packet is the virtual network packet, to create an RPR packet by adding to the first packet an RPR header, and to perform a transmission process to the RPR network on the RPR packet;
   a second node comprising
   the address translation table,
   an RPR layer reception processor to receive the RPR packet and if the RPR packet does not carry an own node address as a transmission source address, to search the address translation table based on the multicast MAC address stored as the RPR destination address of the RPR header, and if a corresponding flag is a valid flag, to regard the RPR packet as being addressed to a virtual network to which the own second node belongs, and to output the RPR packet after deleting the RPR header from the RPR packet, and a MAC layer transmission processor to perform a transmission process to the virtual network on a second packet received from the RPR layer reception processor; and a transmission medium connecting a plurality of nodes in a ring topology with a dual transmission line, the plurality of nodes including the first node and the second node, wherein, the RPR layer transmission processor has a virtual network Protocol Identifier (PID) table containing a plurality of different PIDs and offset values, each of the plurality of PIDs being associated with one of the offset values, the plurality of PIDs specifying the virtual network packet, and if the first packet received from the MAC layer reception processor includes a PID and a virtual network identifier, the RPR layer transmission processor extracts from the virtual network PID table an offset value corresponding to the PID of the first packet, searches the address translation table based on the extracted offset value and the virtual network identifier of the first packet for a corresponding multicast MAC address, and adds to the first packet the RPR header including the corresponding multicast MAC address set therein as an RPR destination address.

4. A packet transmission apparatus for transmitting a packet with a Resilient Packet Ring (RPR) network forming a bandwidth sharing ring as a backbone, the packet transmission apparatus comprising:

an address translation table associating a multicast MAC address and a flag in conjunction with a pair of an offset value and a virtual network identifier, the flag indicating whether the virtual network identifier is valid or invalid and indicating that an own node belongs to a virtual network domain with the virtual network identifier if the flag is a valid flag, the virtual network identifier identifying a virtual network that is a virtual network group set independently of a physical connection;

a Media Access Control (MAC) layer processor to perform a reception process on a first packet received from the virtual network formed on the RPR network, and to perform a transmission process to the virtual network on a second packet from which an RPR header has been deleted; and an RPR layer processor to determine whether the first packet received by the MAC layer processor is a virtual network packet, and if it is determined that the first packet is the virtual network packet, to create an RPR packet by adding to the first packet an RPR header and to perform a transmission process to the RPR network on the RPR packet, and if it is determined that the first packet is an RPR packet and the RPR packet does not carry an own node address as a transmission source address, to search the address translation table based on a stored multicast MAC address stored as the destination address in the RPR header and if a corresponding flag is a valid flag, to regard the RPR packet as being addressed to the virtual network to which the own node belongs, and to pass the RPR packet to the MAC layer processor after deleting the RPR header from the RPR packet, wherein, the RPR layer processor has a virtual network Protocol Identifier (PID) table containing a plurality of different PIDs and offset values, each of the plurality of PIDs being associated with one of the offset values, the plurality of PIDs specifying the virtual network packet, and if the first packet received from the MAC layer processor includes a PID and a virtual network identifier, the RPR layer processor extracts from the virtual network PID table an offset value corresponding to the PID of the first packet, searches the address translation table based on the extracted offset value and the virtual network identifier of the first packet for a corresponding multicast MAC address, and adds to the first packet the RPR header including the corresponding multicast MAC address set therein as an RPR destination address.

5. The packet transmission apparatus according to claim 4, wherein the RPR layer processor has an untag table that contains a temporary virtual network identifier and a validity flag indicating whether an untagged packet is destroyed or not, and if determining based on the validity flag that the untagged packet is not destroyed, creates the RPR packet from the untagged packet by allotting the temporary virtual network identifier to the untagged packet.

6. The packet transmission apparatus according to claim 4, wherein the RPR layer processor decrements a count value included in the RPR packet at a time of forwarding the RPR packet, and if the count value is calculated to zero, destroys the RPR packet, the count value initialized to a number of RPR nodes minus one at a time of creating the RPR packet.

7. The packet transmission apparatus according to claim 4, wherein the RPR layer processor determines, packet by packet, a transmission direction, an east side or a west side, on the RPR network based on a result of a hash operation performed on a specified packet region at a time of forwarding the RPR packet.

8. The packet transmission apparatus according to claim 4, wherein:

the address translation table shows a transmission direction, an east side or a west side on the RPR network for forwarding the RPR packet, for each virtual network identifier; and the RPR layer processor determines the transmission direction of the RPR packet based on the virtual network identifier with reference to the address translation table.

9. The packet transmission apparatus according to claim 4, wherein:

the address translation table has East/West fields and a hash field for each virtual network identifier, the East/West fields specifying a transmission direction, an east side or a west side, on the RPR network for forwarding the RPR packet, the hash field showing whether to determine the transmission direction, the east side or the west side, with a hash operation; and the RPR layer processor determines the transmission direction with reference to the East/West fields if the East/West fields specify the transmission direction, and determines the transmission direction based on a result of the hash operation performed on a specified packet region if the hash field shows that the transmission direction should be determined with the hash operation.

10. The packet transmission apparatus according to claim 4, wherein:

the address translation table has East/West fields and a hash field for each virtual network identifier, the East/West fields specifying a transmission direction, an east side or a west side, on the RPR network for forwarding the RPR packet, the hash field showing whether to determine the transmission direction, the east side or the west side, with a hash operation using a plurality of different hash operators; and the RPR layer processor determines the transmission direction with reference to the East/West fields if the East/West fields specify the transmission direction, and if the hash field has a set value, determines the transmission direction based on a result of the hash operation using a hash operator corresponding to the set value.

11. The packet transmission apparatus according to claim 4, wherein:

the address translation table has a Time To Live (TTL) value that is a number of communication target nodes that realizes a shortest forwarding route on the virtual network formed on the RPR network; and the RPR layer processor decrements a count value included in the RPR packet at a time of forwarding the RPR packet, and if the count value is calculated to zero, destroys the RPR packet, the count value initialized to the TTL value at a time of creating the RPR packet.

12. The packet transmission apparatus according to claim 4, wherein the address translation table has, for each virtual network identifier, a Time To Live (TTL) value setting field and a hash field, the TTL value setting field indicating a number of communication target nodes that realizes a shortest forwarding route on the virtual network formed on the RPR network, the hash field showing whether to determine a transmission direction, an east side or a west side, with a hash operation.

13. The packet transmission apparatus according to claim 4, wherein:

the address translation table sets a Time To Live (TTL) value for each of an east side and a west side for each virtual network identifier, the TTL value being a number of communication target nodes that realizes a shortest forwarding route on the virtual network formed on the RPR network; and the RPR layer processor transmits the RPR packet with the TTL value of the east side and the RPR packet with the TTL value of the west side to the RPR network from the east side and the west side, respectively.

14. The packet transmission apparatus according to claim 4, further comprising a class conversion table for converting a priority class set by priority bits in the virtual network packet to a priority class of the RPR packet, wherein the RPR layer processor searches the class conversion table based on the priority class of the virtual network packet received via the MAC layer processor for the priority class of the RPR packet.

15. The packet transmission apparatus according to claim 4, further comprising a class conversion table for classifying an untagged packet into a priority class of the RPR packet, wherein the RPR layer processor searches the class conversion table based on the untagged packet received via the MAC layer processor for the priority class of the untagged packet.

16. The packet transmission apparatus according to claim 4, further comprising a plurality of class conversion tables corresponding to a plurality of conversion rules in order to convert a priority class set by priority bits in the virtual network packet into a priority class of the RPR packet, wherein the plurality of class conversion tables each is allotted to each virtual network identifier.

17. The packet transmission apparatus according to claim 4, wherein the RPR layer processor transmits to the RPR network a control packet including network topology information and troubling information of the RPR network.

18. The packet transmission apparatus according to claim 4, wherein an administrator terminal is connected to display table information including information of the address translation table and states of apparatus on a screen and to set operation of the apparatus.

* * * * *